United States Statutory Invention Registration [19]

[11] Reg. Number: H586

Kun [43] Published: Feb. 7, 1989

[54] ISDN D CHANNEL HANDLER

[76] Inventor: Randall D. Kun, 10 Cyrus Court, Nepean, Ontario, Canada, K2H 9C9

[21] Appl. No.: 26,502

[22] Filed: Mar. 16, 1987

[30] Foreign Application Priority Data

Jun. 20, 1986 [CA] Canada ..... 512045

[51] Int. Cl.[4] ..... H04J 3/24

[52] U.S. Cl. ..... 370/94; 370/92

[56] References Cited

U.S. PATENT DOCUMENTS 4,612,636 9/1996 Grover et al. ..... 370/94

4,621,359 11/1986 McMillen ..... 370/94

4,646,294 2/1987 Eliscu et al. ..... 370/94

*Primary Examiner*—Stephen C. Buczinski

*Assistant Examiner*—Linda J. Wallace

[57] ABSTRACT

In an integrated services digital network (ISDN) a telephone subscriber is physically connected to a telephone exchange by a digital signal subscriber loop which provides in time division multiplex (TDM), two B channels and a D channel. The two B channels are used for voice and data at a bit rate of sixty-four kilobits per second each. The D channel is used for packet data and for telephone signalling and supervision at a bit rate of sixteen kilobits per second. An ISDN D channel handler, in an exchange termination (ET) collects D channel data from and distributes D channel data to various ISDN subscriber lines. A frame processor, in the D channel handler, receives D channel information as it occurs in each of the receive channels. It directs D channel data to a receive buffer storage location where it is accessible by a translator. The translator recognizes information in the data which relates to supervisory and signalling functions, and passes the information to a central controller in the ET. Likewise, signalling and supervisory information destined for an ISDN subscriber line is translated into ISDN compatible data which is stored in transmit buffer storage locations. The frame processor subsequently pulls this data from the stroage locations, and formats it according to CCITT standard, before transmitting it on the appropriate transmit D channel of the TDM bit stream to the subscriber. Packet data received in the D channel is recognized after it has been stored in the receive buffer storage location and then is immediately queued for transmission via the frame processor and a digital transmission link to a separate packet network. Packet data from the separate packet network is received from the digital transmission link and stored via the frame processor in buffer storage locations. Subsequently, the information bits of each stored data packet are formatted according to the CCITT standard by the frame processor, and transmitted to the intended subscriber on the appropriate D channel.

11 Claims, 28 Drawing Sheets

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BIT POSITION

| 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|
| m16 | m15 | m14 | m13 | m12 | m11 | m10 | m9 | m8 | m7 | m6 | m5 | m4 | m3 | m2 | m1 | WORD 0 |
| m32 | m31 | m30 | m29 | m28 | m27 | m26 | m25 | m24 | m23 | m22 | m21 | m20 | m19 | m18 | m17 | WORD 1 |
| | | | | | | | | | | | | | | | | ETC. |
| 0 | 0 | 0 | 0 | 0 | 0 | mk | m k-1 | m k-2 | m k-3 | m k-4 | m k-5 | m k-6 | m k-7 | m k-8 | m k-9 | LAST WORD |

BIT ALIGNMENT FOR RX FRAME CONTENTS FIELDS, BP=0

FIG. 8

BIT POSITION

| 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|
| m8 | m7 | m6 | m5 | m4 | m3 | m2 | m1 | m16 | m15 | m14 | m13 | m12 | m11 | m10 | m9 | WORD 0 |
| m24 | m23 | m22 | m21 | m20 | m19 | m18 | m17 | m32 | m31 | m30 | m29 | m28 | m27 | m26 | m25 | WORD 1 |
| | | | | | | | | | | | | | | | | ETC. |
| m k-2 | m k-3 | m k-4 | m k-5 | m k-6 | m k-7 | m k-8 | m k-9 | 0 | 0 | 0 | 0 | 0 | 0 | mk | m k-1 | LAST WORD |

BIT ALIGNMENT FOR RX FRAME CONTENTS FIELDS, BP=1

FIG. 9

BIT POSITION

| 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|
| m8 | m7 | m6 | m5 | m4 | m3 | m2 | m1 | | | | | | | | | WORD 0 |
| m24 | m23 | m22 | m21 | m20 | m19 | m18 | m17 | m16 | m15 | m14 | m13 | m12 | m11 | m10 | m9 | WORD 1 |
| | | | | | | | | | | | | | | | | ETC. |
| | | | | | | | | | mk | m k-1 | m k-2 | m k-3 | m k-4 | m k-5 | m k-6 | LAST WORD |

BIT ALIGNMENT FOR TX FRAME CONTENTS FIELDS, BP=0

FIG. 10

BIT POSITION

| 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|
| | | | | | | | | m8 | m7 | m6 | m5 | m4 | m3 | m2 | m1 | WORD 0 |
| m16 | m15 | m14 | m13 | m12 | m11 | m10 | m9 | m24 | m23 | m22 | m21 | m20 | m19 | m18 | m17 | WORD 1 |
| | | | | | | | | | | | | | | | | ETC. |
| | mk | m k-1 | m k-2 | m k-3 | m k-4 | m k-5 | m k-6 | | | | | | | | | LAST WORD |

BIT ALIGNMENT FOR TX FRAME CONTENTS FIELDS, BP=1

FIG. 11

ISDN D CHANNEL HANDLER

The invention is in the field of telephone switching systems and more particularly relates to D channel handling in integrated services digital networks more commonly referred to as ISDNs.

BACKGROUND OF THE INVENTION

Traditionally telephone services have been provided by telephone switching systems each being linked to a multitude of telephone station sets via telephone lines which carry direct operating current and alternating currents of voice band frequencies and lower. These telephone services are limited to those communication services providable within the voice bandwidth. Sometime ago, it became common practice to provide long distance digital trunks between various switching systems by means of pulse code modulated time division multiplexed (PCM TDM) carrier, for example T1 carrier which provides twenty-four digital signal channels each of sixty-four kilobits per second. This required multiplexing and demultiplexing, and encoding and decoding of each analog voice band signal for transmission and reception.

Recently PCM TDM telephone switching systems having been installed to the extent that about forty percent of the telephone switching facilities in North America are of the digital type. Typically in such systems each subscriber telephone line carries analog signals and is connected to the telephone switch by a line interface circuit. Each line interface circuit includes a CODEC which performs analog to digital signal conversion and digital to analog signal conversion. Each line interface circuit also includes signalling and supervision circuitry for detecting ON HOOK and OFF HOOK conditions. Some examples of such PCM TDM telephone systems ar those manufactured by the assignee and sold under the registered trademarks SL and DMS. These systems are representative of an evolution in telephony which has increased the quality and efficiency of telephone services. However, despite the digital capability of modern telephone exchanges, available telephone services generally continue to be limited to those providable within the voice band available on analog telephone lines.

Recently, digital telephone service for voice and data has been available in some private branch exchanges (PBX) digital systems, via proprietary digital telephone lines and interface circuits. One problem with proprietary digital telephone lines is that corresponding proprietary station or terminal apparatus are required in order to compatibly communicate via the switching system. In the realm of private branch exchanges (PBXs) and private networks, this restrictive requirement has proven to be inconvenient. However, in the realm of public telephone networks, the inability to communicate digitally via apparatus of different manufacture and hence different protocol requirements has rendered many potential advanced telephone services to be simply impractical.

This impracticality has long bedeviled the telephone industry. It was only in 1984 that The International Telegraph and Telephone Consultative Committee (CCITT) of the International Telecommunication Union established recommendations for a standard Integrated Services Digital Network (ISDN). This recommendation was published in Geneva Switzerland in 1985 with an identification number ISBN 92-61-02081-X.

ISDN is an all-digital network standardized concept intended to provide end-to-end digital connectivity to support a wide range of voice services and non-voice services, for example, data and video services. These recommendations are the basis for the ISDNs currently being planned for deployment. ISDN subscribers will have access to these services through a number of internationally standardized, multi-purpose user network interfaces. ISDNs are evolving from existing digital telecommunications networks, by progressively incorporating additional functions and network features so as to provide users with a standard integrated access to both existing and new services. Various manufacturers of fully digital telecommunications equipment are about to, or have, supplied equipment for ISDN field trials and are committed to build equipment for full scale deployment. This equipment is typically based upon functional integrations of existing digital circuit switches and packet switches.

FIG. 1 of the accompanying drawings illustrates one prior art example of a typical time division switching system which is readily adaptable to serving as an exchange termination (ET) in an integrated services digital network (ISDN) by means of a D channel handler. This switching system is described in U.S. Pat. No. 4,213,201.

Briefly, the system illustrated in FIG. 1 includes four principal areas, namely, a peripheral modules area 1, a network area 2, a central control complex area 3, and a maintenance and administration area 4. The switching network contained in the network area 2 is a so-called folded network. The switching network is duplicated for reliability as illustrated by identical networks labelled as "plane 0" and "plane 1". The peripheral modules area 1 contains three kinds of peripheral modules. For example, the line module serves local telephone lines carrying analog speech signals which are digitized and grouped into time division multiplex groups of thirty-two channels, of which thirty channels in each group are used for communication with the duplicated switching network planes via network links. The line module can be regarded as a stage of time division switching because it provides concentration in contrast to a trunk module which normally connects thirty trunks to thirty duplicated network link channels on a non-blocking basis. Both the line and trunk modules also provide conversion for analog and pulse code modulated signal formats in contrast to the digital carrier module which merely provides a reframing interface between digital carrier facilities and the switching network planes.

The central control area 3 of the switching system, like the network area 2, contains facilities all of which are duplicated for reliability in the system. As shown in FIG. 1, central message controllers (CMCs) are connected by control signal links to both of the network planes. Likewise two central processing units are each connected by parallel buses to both of the CMCs. Data stores 0 and 1 and program stores 0 and 1 are connected, as shown, to the central processing units. The CMCs are each connected a to network module controller (NMC), not shown, in the switching network planes 0 and 1 by the control signal links. Equipment of the maintenance and administration area 4 are interconnected with the equipment of the central control area 3 through the CMCs.

Call processing is hierarchically distributed between the central control (CC) area 3 and the peripheral module (PM) areas 1. For example, translation is done in the CC area 3, while digit collection and call supervision are handled in the PMs area 1.

In operation of the switching system in FIG. 1, the CPUs of the CC area 3 are responsive to signals received from at least one of the PMs to set up and tear down communications channels between various of the lines and trunks served by the line, trunk and carrier modules in the PMs 1. Signals representing requests for service, and subsequent call progress and control of the switching network, are passed through the network 2 on at least one of the two remaining channels of the thirty-two channels of each time division group. One example of an analog subscriber interface circuit which communicates signalling and supervision messages via a signalling channel is described by Harold Harris in an article titled "The Line Card" published by Bell-Northern Research Ltd. in TELESIS, the fourth issue of 1980. The CMCs function is to both assemble messages from the signalling channels for presentation to the central processing units and to distribute messages from the central processing units to the appropriate signalling channels.

The principles of the present invention as embodied in the ISDN D channel handler and its application, are useful in an adaptation of virtually any TDM PCM telephony switching system to ISDN, as well as being applicable to designs of future switching systems.

The CCITT recommendation for ISDNs defines several layers of standard protocols, which when adhered to, permit open digital communication between terminal and station apparatus of various equipment manufacture via circuit switched digital telephone systems. The ISDN basic interface protocol defines a signal format for a subscribed loop. The signal format includes two sixty-four kilobits per second channels, termed B channels, and a sixteen kilobits per second channel, termed a D channel. The B channels are used for encoded voice and for data and are normally intended to be circuit switched in an exchange termination (ET), for example an associated TDM switching facility. The D channel is available for at least two uses, one being an exchange of supervisory and signalling information between a subscriber terminal or telephone station set and the ET, and the other being communication of packet data via the ET and a packet communication network, which is linked to the ET.

In the ET, ISDN formatted signals received from an ISDN subscriber line are separated into the B and D channel components. One or both of the B channels may be circuit switched in the ET. The D channel may be communicated to a packet network or alternately any supervisory and signalling information in the D channel is ultimately communicated to a central controller of the ET. Likewise D and B channel information destined for the ISDN subscriber are assembled within the ET in the prescribed ISDN signal format for transmission via the ISDN subscriber's line.

One of the problems in adapting existing digital circuit switching systems to the ET function in ISDN service is that of handling the D channel signalling and supervision information. In addition, packet switch destined data must be so identified and thereafter forwarded to an associated packet network. Signalling and supervision information destined for the controller in the digital circuit switch must be collected and translated into the appropriate format. Likewise signalling and supervision information destined for the ISDN subscriber must be translated into the ISDN protocol. Traditionally, the corresponding functions for analog telephones connected to a digital circuit switch have been performed in line interface circuits, there being one for each telephone line, for example as described by Harold Harris in the previously mentioned publication in TELESIS.

One of the problems in handling a D channel is the variable rate at which D channel information may occur. This information may have to be handled at the full sixteen kilobits per second rate in both transmit and receive directions. However, in contrast there may be no D channel information at all for significant periods of time. This variable rate dictates that either very fast signal processing apparatus be provided or alternately that a very large buffer memory be provided, on a per ISDN telephone line basis. One way or the other, the effective peak information capacity of the D channel handler is seldom ever used and frequently the D channel handler is inactive for extended periods of time. Provision for ISDN subscriber signalling and supervision in the line circuit, as suggested by tradition, promises to be expensive.

SUMMARY OF THE INVENTION

It is an object of the invention to provide a D channel handler for digital circuit switching systems which will reduce the cost of adapting present switching systems to be exchange terminations (ETs), compatible with the CCITT recommendation for ISDNs.

It is an object of the invention to provide a D channel handler for an ISDN, wherein the D channel handler is shared between numerous ISDN subscriber line terminations at an ET.

In accordance with the invention, a D channel handler in an exchange termination, collects data from and distributes data to various ISDN subscriber lines associated with corresponding channels in a TDM bit stream. A frame processor in the D channel handler directs D channel data related to signalling and supervision to a large buffer storage location which is accessible by a translator. D channel packet data information is recognized and routed to an associated packet network.

The invention is a method for exchange terminating D channelized informations originating at ISDN subscriber terminals. Bit states of prearranged bit position occurrence in a bit stream are received from ISDN subscriber digital line associated time division multiplexed channels. In relation to each of said channels, start flags and stop flags, as indicated by an occurrence of a predetermined exclusive series of said bit state occurrences are detected. A start address is selected for defining the first of a series of storage locations for storing bit states, of a channel, which occurred between the start and stop flags. The bit states are stored at the series of storage locations defined by incrementing the start address by a factor related to the number of bits between the start and stop flags and the start address is stored in a predefined input address queue for subsequent use in accessing said series of storage locations.

In a frame processor apparatus for an ISDN D channel handler, the invention is also an asynchronous interface means comprising receive and transmit data queues. The receive data queue includes an input port for receiving data from an incoming TDM signal stream. A queue input control means is responsive to an incoming control means for specifying storage locations in the receive data queue for temporarily storing the received data. A queue output control means is responsive to an input control time slot signal for specifying storage locations in the receive data queue from whence data is output via an output port, and a receive comparing means is responsive to the specifications of storage locations for indicating one of a close proximity and an overlap of specified storage locations, whereby a rate of data output via the output port may be accelerated by increasing a rapidity of the control time slot signal to prevent an overrun of the temporarily stored data. In the transmit data queue, a queue input control means is responsive to an output control time slot signal for specifying storage locations in the transmit data queue in which data received via an input port is temporarily stored. An output port provides for transmission of data in a TDM signal stream. A queue output control means is responsive to an output clock time slot signal, similar to said input clock time slot signal, for specifying storage locations in the transmitted data queue from whence data is output via said output port, and a transmit comparing means is responsive to the specifications of storage locations for indicating one of a close proximity and an overlap of specified storage locations, whereby the rate of the data input via the input port may be accelerated by increasing the rapidity of the output control time slot signal to prevent and empty occurrence in the transmit data queue.

BRIEF DESCRIPTION OF THE DRAWINGS

An example embodiment is described, in contrast with prior art switching systems as hereinbefore discussed with reference to FIG. 1, and with reference to the remainder of the accompanying drawings in which:

FIGS. 8 to 11 illustrate bit alignments in receive and transmit frame contents of the frame buffer in FIG. 7;

DESCRIPTION OF THE EXAMPLE EMBODIMENT

Figure 1:
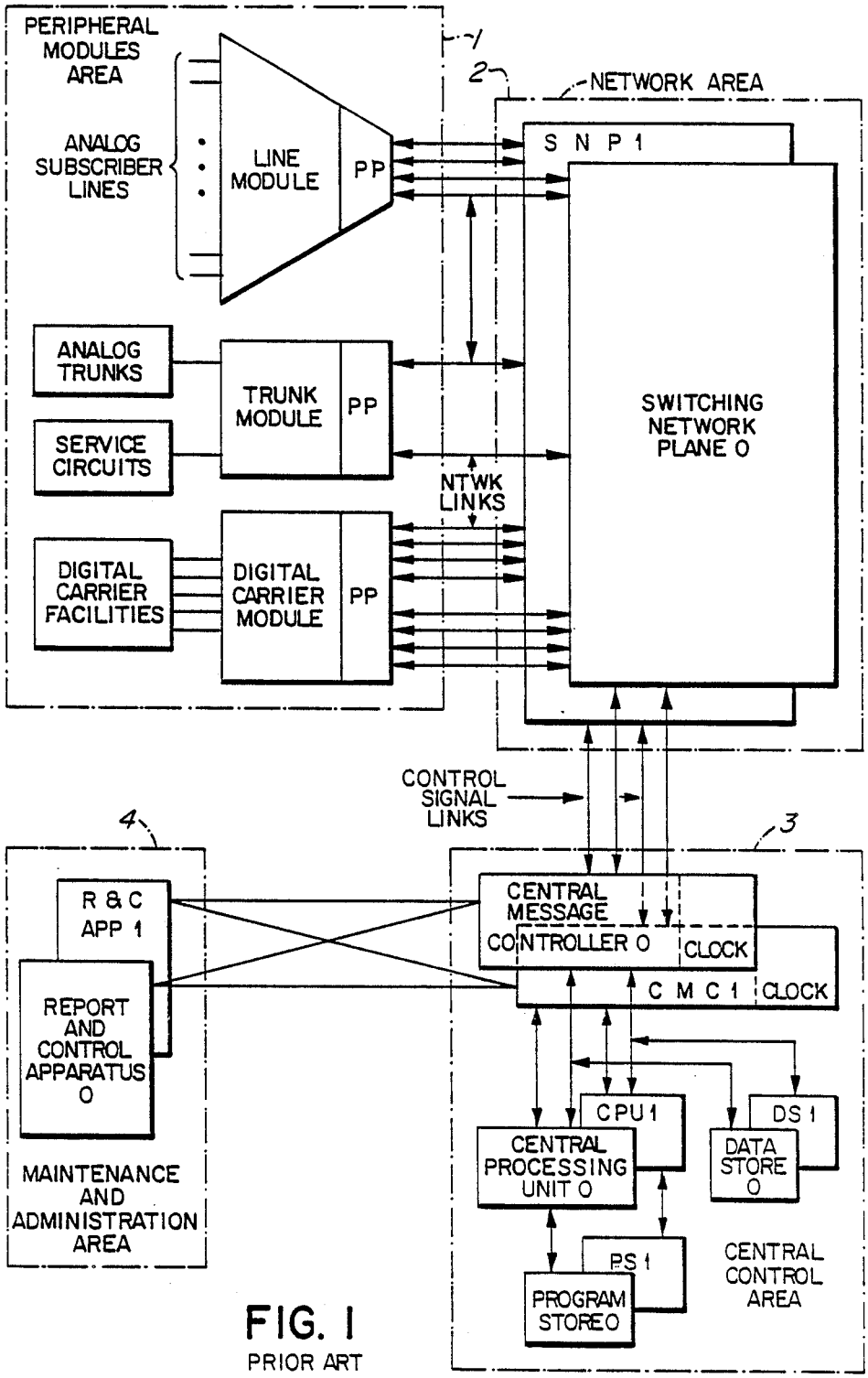
FIG. 1 PRIOR ART
Figure 2:
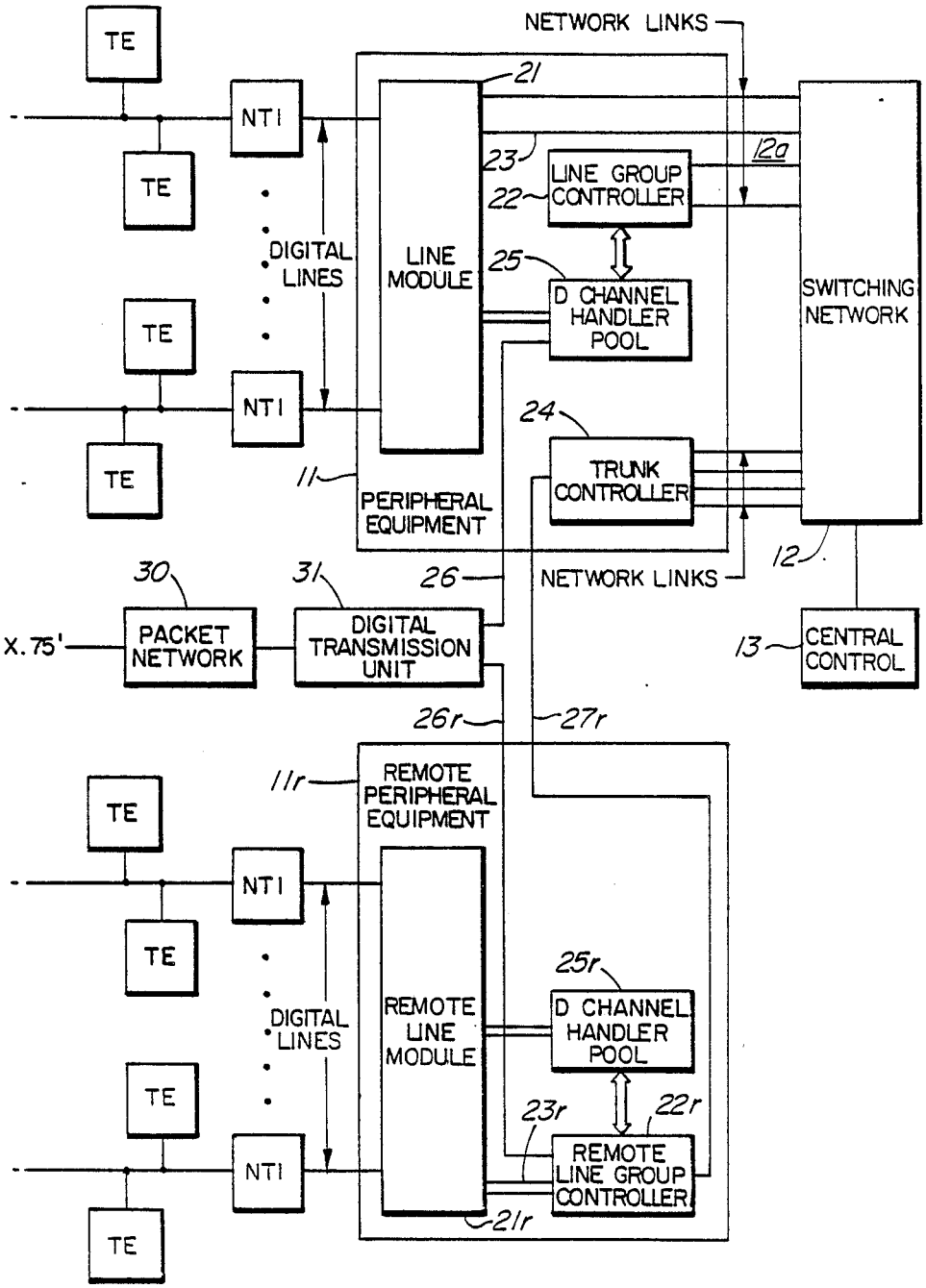
FIG. 2 is a block schematic diagram illustrative of an adaptation of a prior art time division switching system, as exemplified in FIG. 1 in accordance with the invention to provide an ISDN exchange termination (ET)

In FIG. 2, a time division telephony switching system is represented by a switching network 12 connected with a central control 13 to provide telephone service to subscribers connected to peripheral equipment 11 and to remote peripheral equipment 11*r*. In contrast to the previously discussed prior art ISDN subscribers are served via digital lines in contrast to analog lines. However, this does not preclude the illustrated system from connecting with other peripheral equipment for serving analog telephone lines as well, for example as illustrated in FIG. 1.

Figure 3:
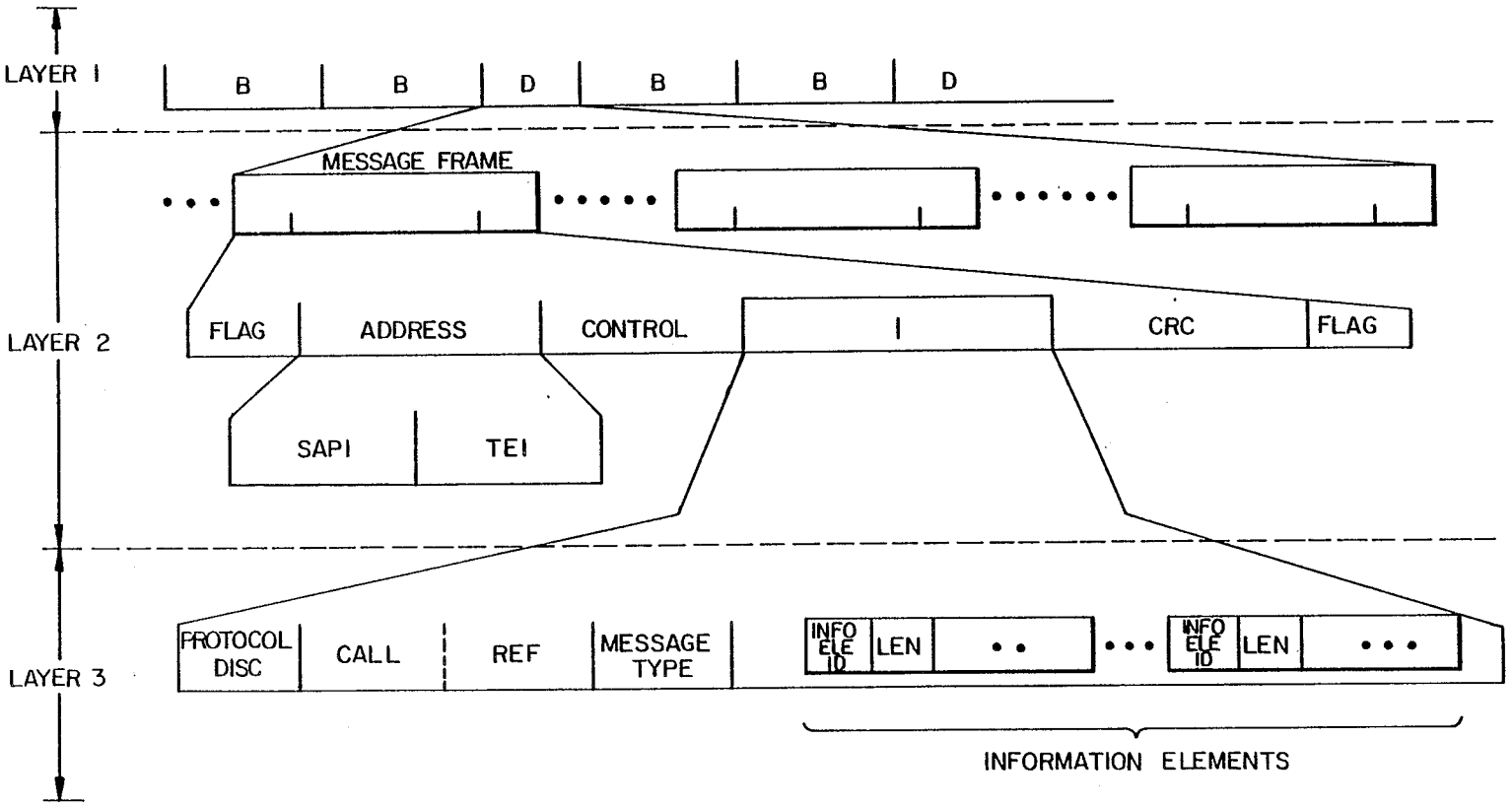
FIG. 3 is an illustration of the ISDN standard protocol layers 1, 2 and 3.

Up to eight units of terminal equipments, each labeled TE, are connectable to a single network termination, labeled NT1, via a so called passive bus operative in accordance with the CCITT ISDN layer 1 protocol recommendations, as shown in FIG. 3. Up to thirty digital lines connect corresponding network termination, NT1s, to the exchange termination ET via a line module 21 in the peripheral equipment 11. One or more so called DS30 link at 23 each provide thirty clear sixty-four kilobits per second channels for duplicated coupling of the D channels via a line group controller 22 to the switching network 12 via network links at 12*a*. The line module also couples D channels, one allocated for each of the digital lines to a D channel handler pool 25. The D channel handlers operate on incoming time division multiplexed D channel bit streams, in order to capture and collect the D channel message frames in a large shared buffer memory, not shown in FIG. 2. The format of the D channel message frames is shown in FIG. 3. The buffer memory is accessed by a processor which determines the purpose of the D channel information by examination of a portion or field of the frame, termed a Service Access Point Identifier (SAPI). A SAPI value of zero indicates that the information in a message frame pertains to signalling and supervision of a related B channel. On the other hand a SAPI value of sixteen indicates that the message frame is packetized data. In the case of the zero valued SAPI, subsequent information elements in the frame as shown in FIG. 3, layer 3 are read from the buffer memory and thereafter translated into the protocol of the central control 13. Once translated, the data is communicated to the central control 13 by the switching network as illustrated in FIG. 2. Alternately the data may be communicated directly to the central control, whichever is more convenient within the architecture of a particular switching system. In the case of a sixteen valued SAPI, the entire message frame is read from the buffer memory and transmitted via the line group controller 22 on a digital link 26 via a digital transmission unit 31 to a packet network 30. The digital link 26 in this embodiment is a T1 standard link as it is well known and was conveniently available. However, only some of the bits of each channel of the T1 link 26 are used for D channel information such that the standard T1 A and B signalling bits operation does not corrupt any of the D channel information. Packet data destined for one of the TEs is transmitted from the packet network 30 via digital transmission unit 31 and the digital link 26 to a D channel handler in the line group controller. The D channel handler merges the packet data into the appropriate D channel for receipt by an associated digital line via the line module 21. Signalling and/or supervision information originating in the central control in relation to one of the TEs, traverses the switching network, being eventually translated into the ISDN protocol to include a value zero SAPI and be stored in the shared buffer memory. Thereafter one of the D channel handlers reads the information bits from the shared buffer memory and sequentially inserts the information bits into bit positions of a channel dedicated to that digital line.

FIG. 2 also illustrates a remote peripheral equipment 11*r* which includes a remote line module 21*r* which is transmission standard DS30 linked at 23*r* to a remote line group controller 22*r*. The remote line group controller 22*r* is coupled to a D channel handler pool 25*r* and to a trunk controller 24 and the packet network via T1 links at 27*r* and 26*r* respectively. It should be noted that in this example the remote line group controller 22*r* is substantially the same as the controller 22. It could just as well be coupled via DS30 links at 27*r* and 26*r*. However as T1 transmission facilities are commonly in place in North America, remote line controllers for use in North America are T1 compatible. Aside from the fact that the peripheral equipment 11*r* is remote it operates in a manner identical to that previously discussed in regard to the peripheral equipment 11 with the minor exception that T1 links are used at 27*r*. The trunk controller 24 provides an interface to the DS30 input/output operating signal format of the switching network 12.

It is preferred that a D channel handler pool includes at least two D channel handlers however the required functionality is providable by a single D channel handler albeit with less certainty as to long term service reliability. Two examples of D channel handler systems are illustrated in the FIGS. 4*a* and 4*b*. The functions and structures of these examples are discussed in the following functional description.

System Overview

Figure 4A:
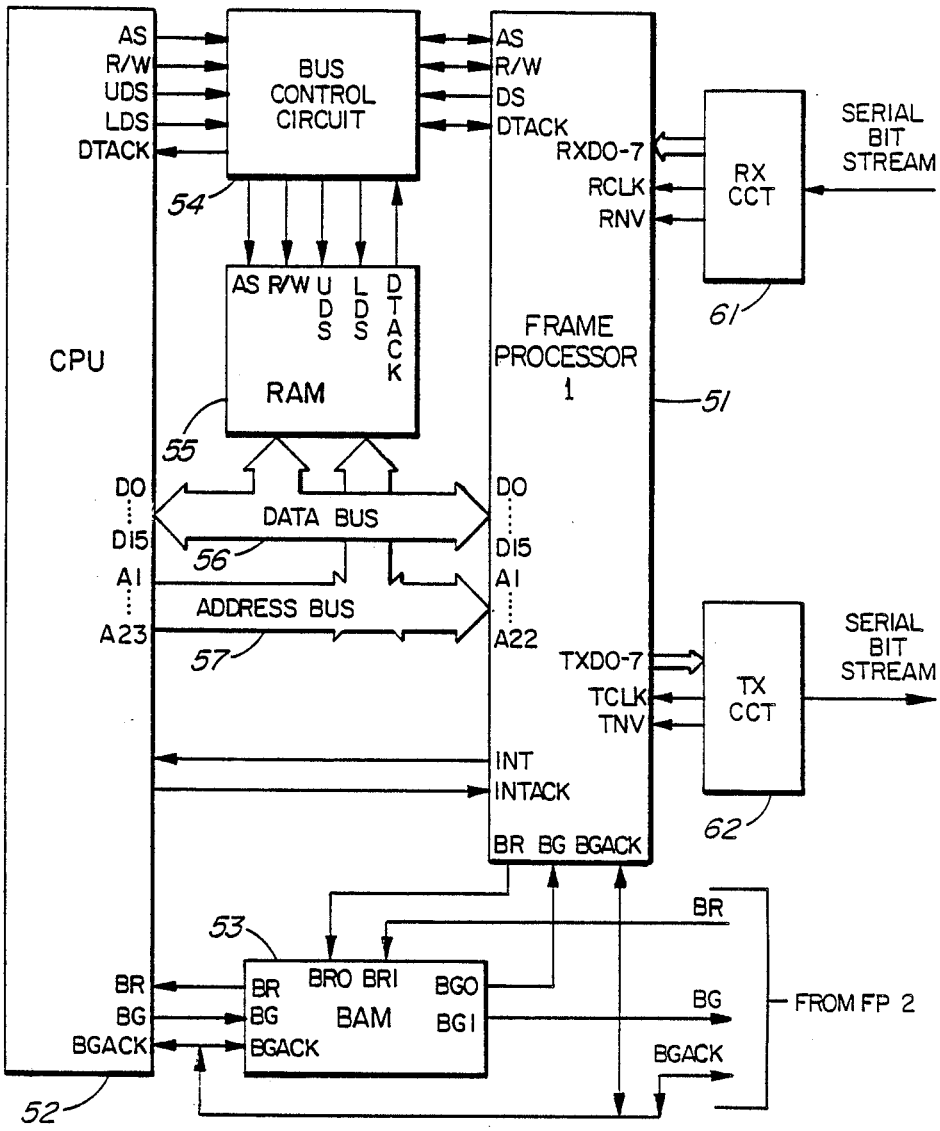
FIGS. 4*a* and 4*b* are block schematic diagrams of two embodiments of a D channel handler, suitable for use in a D channel handler pool in FIG. 2.
Figure 4B:
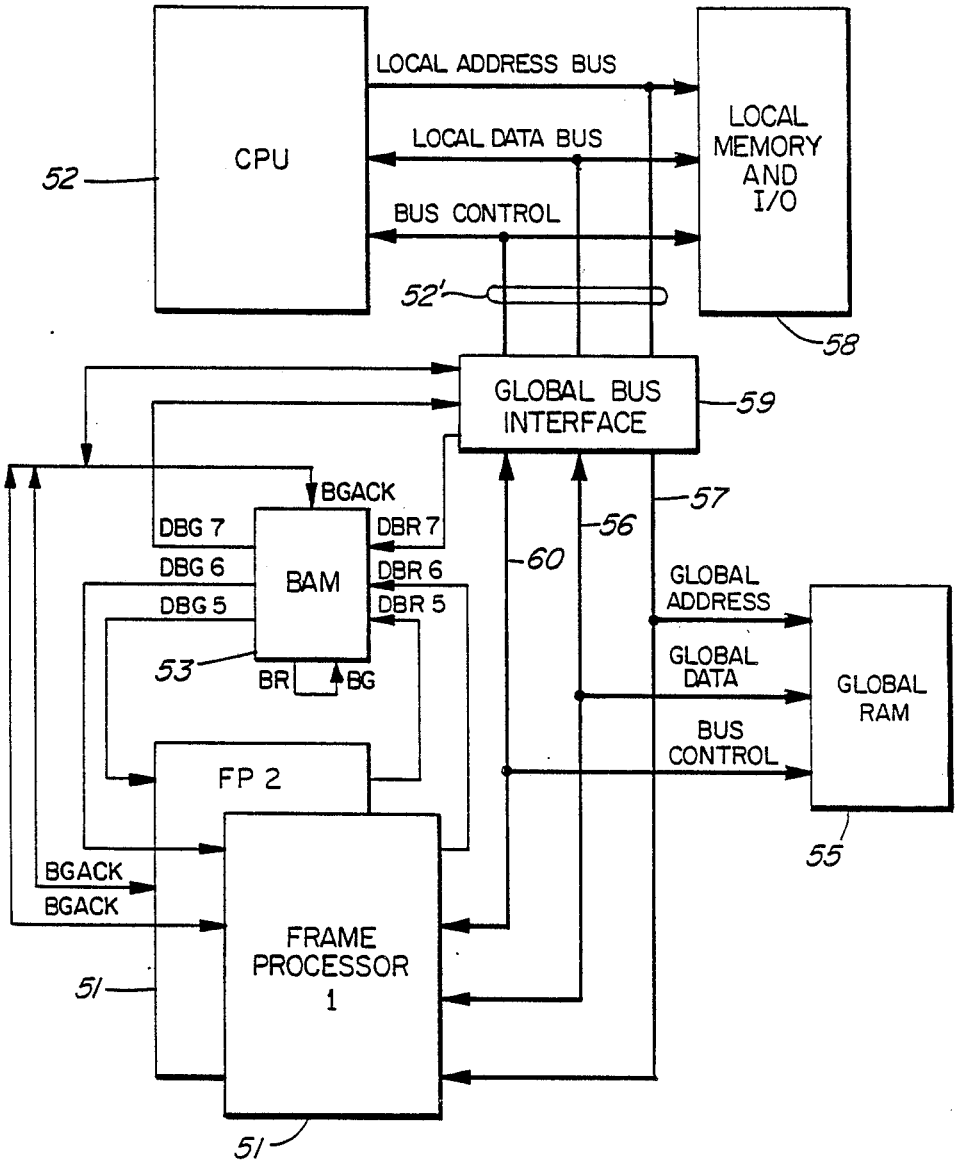

In FIGS. 4*a* and 4*b* many of the elements are interchangeable between the figures and are thus identified by labels which are similar or the same.

Referring to FIG. 4*a*, at a time of initialization, a frame processor 51 receives information from a CPU 52, which defines receive and transmit bit stream multiplexing formats. Once defined, all succeeding multiplexing frames in a given direction are assumed to have the same format until the format is redefined by the CPU 52. The frame processor 51 handles physical multiplexing of frame formats with up to twenty-four eight-bit time slots via a receiver circuit 61 and a transmitter circuit 62. Bit states in each time slot can be mapped to any of up to twenty-four logical channels. None, some or all of a time slot's eight bits can be defined as being significant, that is, being part of channel's bandwidth. The significant bits of a time slot are known collectively as a bit block. This allows the definition of subrates and super-channels. For example, if a given channel's bandwidth is defined as all eight bits of a single time slot in a multiplexing frame, and the multiplexing frame period is one hundred and twenty-five microseconds, the bit rate for that channel would be sixty-four kilobits per second. A sixteen kilobits per second channel, for example a D channel, is obtained by defining a bit block of two bits in an eight bit time slot. Since one or more time slots are assignable to a single logic channel, any bit rate that is a multiple of the base rate is obtainable, up to a maximum bit rate corresponding to the transmission rate of the multiplexing system.

In a receive direction, each channel's logical bit stream, appearing on leads RXD 0–7 is scanned for starting flags. Once a starting flag of a frame is encountered, the logical bit stream is scanned for a stop flag while words of data are accumulated and written to a frame buffer in shared random access memory (RAM) 55 until the stop flag is encountered. Thereafter a header containing frame status information is written to the frame buffer. An address pointer to the frame buffer which now contains the frame contents is then placed in a receive queue for that channel. The receive queue in this example also resides in the RAM 55.

In a transmit direction, the CPU 52 informs the frame processor 51 when it has placed an address pointer to the frame buffer in a transmit queue, which also resides in the RAM 55. Data from the frame buffer is read and then mapped into the bit block of the appropriate time slots via leads TXD 0-7. Transmission of the data is preceded by transmission of the starting flag and followed by transmission of the stop flag. If there is no pending data to be transmitted on a particular channel, that channel's bandwidth is filled with idle code for example, continuous one state bits.

Typical System Configurations

The frame processor 51 in a preferred embodiment is manifest within a very large scale integrated (VLSI) circuit chip and fits into a system with a minimum of additional support circuitry. Frame processor systems are configurable in either a local or a global bus mode. A typical local bus mode system is that shown in FIG. 4*a*.

In FIG. 4*a*, a receiver 61, multiplexes serial bit streams into the appropriate multiplexing frame format and provides timing signals for the frame processor 51. A transmitter 62, demultiplexes the output of the frame processor into the appropriate serial bit streams and also provides timing signals to the frame processor 51. In a receive portion, internal to the frame processor, frames are recovered from the incoming bit streams and written into the RAM 55. In a transmit portion, internal to the frame processor, messages are read out of the RAM 55 one word at a time and the message is bit encoded according to the CCITT recommendations. These bits are transmitted during the appropriate time slots via the transmitter 62.

In order to access the RAM 55, the frame processor 51 must request and be granted data and address buses 56 and 57 by a bus arbiter. In FIG. 4*a*, bus arbitration is performed by an MC68452 bus arbitration module (BAM) 53 operating in a local bus mode. FIG. 4*a* shows connections required to support two of the frame processors. Control access to the memory is performed by a bus control circuit 54. In a system where only the CPU 52 and frame processor(s) 51 access the RAM 55, the bus control circuit is merely a hardwire connection of the signal leads shown.

The system can also be arranged in a global configuration by connecting the BR outputs to the BG inputs of the BAM 53 together, as illustrated in FIG. 4*b*. In this configuration, the CPU 52 has a private bus 52' which is used for code and scratch pad memory and input/output devices. The CPU accesses the global bus under the same arbitration protocol as used by the frame processors, by generating bus request, (BR) and bus grant acknowledge (BGACK) signals, and accepting as an input a bus grant (BG) from the BAM 53. A global bus interface 59 includes internal tri-state buffers for the address bus and bus control signals, tri-state transceivers for the data bus, and address decode logic for generating bus arbitration signals and device select signals.

D Channel Handler Operation

Figure 5:
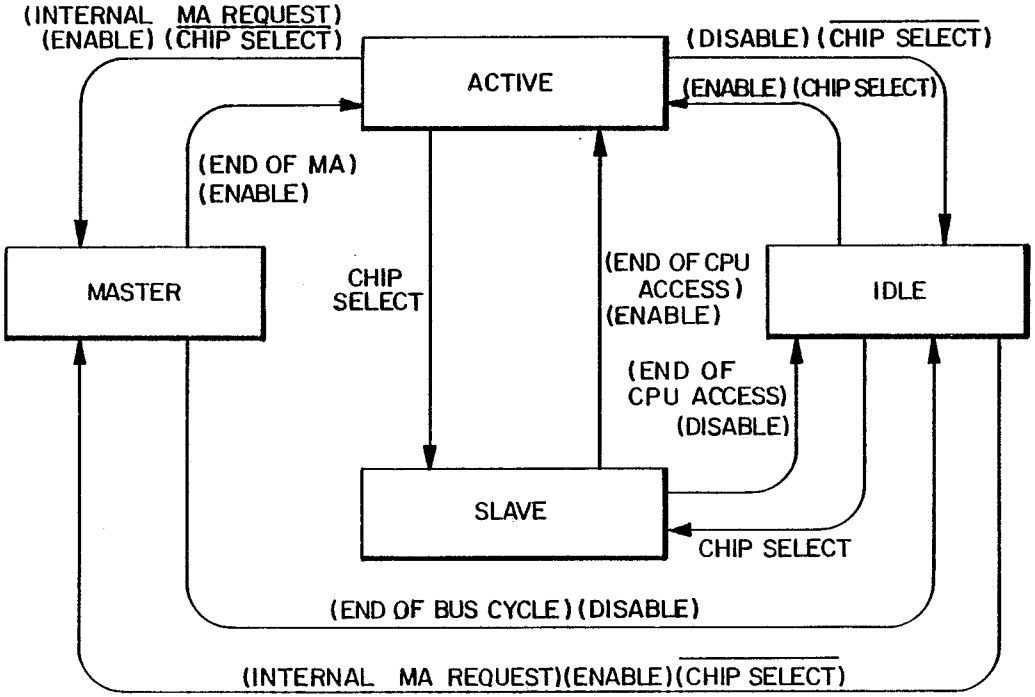
FIG. 5 is a state diagram which illustrates operative modes of a frame processor in FIGS. 4*a* abd 4*b;*

At any instant in time, a frame processor 51 operates in one of four different modes: idle, active, master or slave. The relationship between the various modes is shown in FIG. 5. The idle mode is entered upon reset or halt conditions. In this mode, no frame processing is performed, and the frame processor is inactive on the system bus, which is composed of the data and address buses 56 and 57. The only functions performed in the active mode are those of responding to slave mode accesses, and receiving and transmitting data via the receiver 61 and the transmitter 62. The active mode is the normal operating mode of the frame processor 51, in which data is shifted through the internal frame receiver and frame transmitter circuits. The frame processor is idle relative to the system bus while it is in the active mode. In the master mode, the frame processor has control of the system bus. The master mode is used to transfer data to and from the RAM 55. In the slave mode, the CPU 52 has control of the system bus. The slave mode is used by the CPU 52 to directly access the frame processor to transfer control or status information therebetween.

A more detailed discussion of the operation of the D channel handler is introduced by a functional description of the frame processor's input and output leads and the signals carried thereon. The input and output are functionally grouped for illustration. The address bus 57 includes leads A1 through A22. This is a tri-state bus which allows the frame processor to address up to four Megawords of memory while in the master mode. The leads A1 through A9 are bidirectional, allowing the CPU 52 to write and read a variety of frame processor internal registers in order to select or determine the status of the frame processor. The data bus 56 includes leads D0-D15 and is a bidirectional, tri-state bus which is used for data transactions. Data transactions are always on a sixteen-bit word basis. Asynchronous bus control relates to asynchronous data transfers which are controlled by a combination of signals on the following leads which are illustrated in the FIG. 4*a*: an address strobe lead AS, a read/write lead R/W, data strobe lead DS and a data transfer acknowledge lead DTACK. In the master mode, the address strobe AS is used by the frame processor to indicate a valid address on the address bus 57. In the other modes, the AS is used as an input strobe to monitor activity on the data and address buses. The read/write lead R/W is a bidirectional, tri-state lead used to define a data bus transfer as a read cycle or a write cycle. The data strobe lead DS is a unidirectional, tristate lead used by the frame processor to control data transfers in the direction specified by a read/write signal on the R/W lead. The data transfer acknowledge lead DTACK is a bidirectional, tri-state lead used in both the master and slave modes to determine or indicate when a data transfer is completed. Assertion of a signal on an interrupt lead INT indicates that at least one interrupt source in the frame processor is active. An interrupt acknowledge (INTACK) signal on an INTACK lead is used by the CPU 52 to acknowledge an interrupt from the frame processor 51.

In operation of the BAM 53, bus arbitration control signals are provided on three signal leads BR, BG and BGACK. Bus request BR, bus grant BG and bus grant acknowledge BGACK signals are carried on these leads and are compatible with the Motorola 68000 family asynchronous bus arbitration protocol, which is available in a publication by Motorola Corp., of 1303 East Algonquin Road, Roselle, Ill., 60196, U.S.A. The bus request BR signal is asserted by the frame processor 51 to indicate that it requires control of the address and data buses. The BR signal is negated when the frame processor enters the master mode with the BGACK lead being asserted. The bus grant BG signal is asserted to indicate that the frame processor 51 may gain control of the bus at the end of the current bus cycle. The bus grant acknowledge BGACK is a bidirectional signal which is asserted by the frame processor to indicate that it is currently in control of the bus. This signal is not asserted unless the BG signal is asserted and the AS, DTACK, and BGACK signals are negated, indicating that all other devices are off the bus. The BGACK signal is negated when the frame processor's bus access is complete.

Interfaces to the receive circuit 61 and the transmit circuit 62 are defined by clock, and next vector signals. The data signals are carried on the leads RXD 0–7 and TXD 0–7. These are two eight-bit buses which are used for parallel transfers of data bit blocks to and from a frame processor 51. A receive clock RCLK and a transmit clock TCLK are used to receive data on the leads RXD 0–7 and to transmit data on the leads TXD 0–7 respectively. Signals on receive next vector RNV and transmit next vector TNV leads are used to inform the frame processor of the start of the current receive and transmit multiplexer frames. In this example, these are T1 frames.

Transfers of information between the frame processor 51 and the line modules 21 or 21*r* , as before mentioned, require mapping of bits between switching system time slots and subscriber interface D channel bit streams. In the receive direction, internal frame processor bit stream circuitry recovers the data that is contained in the D channel by first reassembling the D channel bit stream from the bits of the multiplexer frame time slots, and then offering these bits to internal on following circuitry. In the transmit direction, the transmit side bit stream circuitry takes encoded bit streams, from internal preceding circuitry, and maps them into the appropriate bits of the TX T1 frame. Internal RX and TX configuration memories provide a flexible means of specifying these mappings. The discussion which follows restricts itself to the receive side mapping of time slots to channel bit streams. It suffices to note that the transmit side configuration memory is similar to the receive side configuration memory, and that the transmit side mapping performs the reverse operation of the receive side mapping, the reverse operation being mapping from channel bit streams into the time slots of T1 frames.

The multiplexing formats of the receive and transmit side bit stream interfaces are stored independently in the respective internal RX and TX configuration memories in the frame processor. Each word in a configuration memory contains a channel number field and a bit map field. There is one configuration word for each time slot. The channel number field allows each time slot of the multiplexing frame format to be identified with a logical channel number. The bit map field allows from zero to eight of the time slot's bits to be tagged as significant, that is part of a channel's bandwidth.

Figure 6:
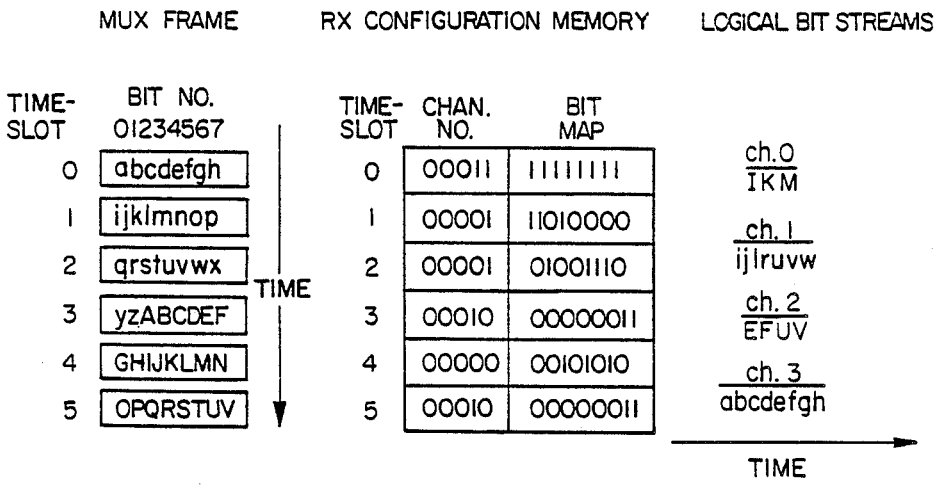
FIG. 6 illustrates allocation of configuration memory space in the frame processor in FIGS. 4*a* and 4*b;*

In an illustrative receive side bit mapping example: a multiplexing frame format consists of six time slots, containing logical bit streams of four channels. FIG. 6 shows how the configuration memory is used to extract logical bit streams from the T1 frame. The bits of the T1 frame format are identified in FIG. 6 by upper and lower case letters so that the bit mapping can be more easily traced. Each bit of a time slot's bit map that is set to "1" indicates that the corresponding bit of the time slot is part of the channel's logical bandwidth, and will be processed by the on following receiver circuitry. If a bit map bit is "0", the corresponding time slot bit is ignored. FIG. 6 also demonstrates the order in which data bits appearing on RXD 0–7 are shifted through the receiver circuitry. Data bits received on RXD 0–7 are shifted into the receiver circuitry in order of increasing time slot bit number, so that the internal bit order is time slot 0–bit 0, time slot 0–bit 1, . . . time slot 0–bit 7, time slot 1–bit 0, et cetera. Of course the bit map determines whether a bit of a particular time slot is actually transferred or not. In the transmit direction, parallel data is transmitted such that the bit order of the message is time slot 0–bit 0 , time slot 0–bit 1, . . . time slot 0–bit 7, time slot 1–bit 0, et cetera. The bit map determines whether a particular bit of the time slot is filled with channel data.

Frame Processor/CPU Interface

This section discusses a queueing interface between the frame processor 51 and the CPU 52. This interface is contained in the stored buffer memory within the RAM 55. The data structure used to pass messages between the frame processor 51 and the CPU 52 is described first, followed by a description of how pointers to these data structures are organized into queues on a per channel basis.

Figure 7:
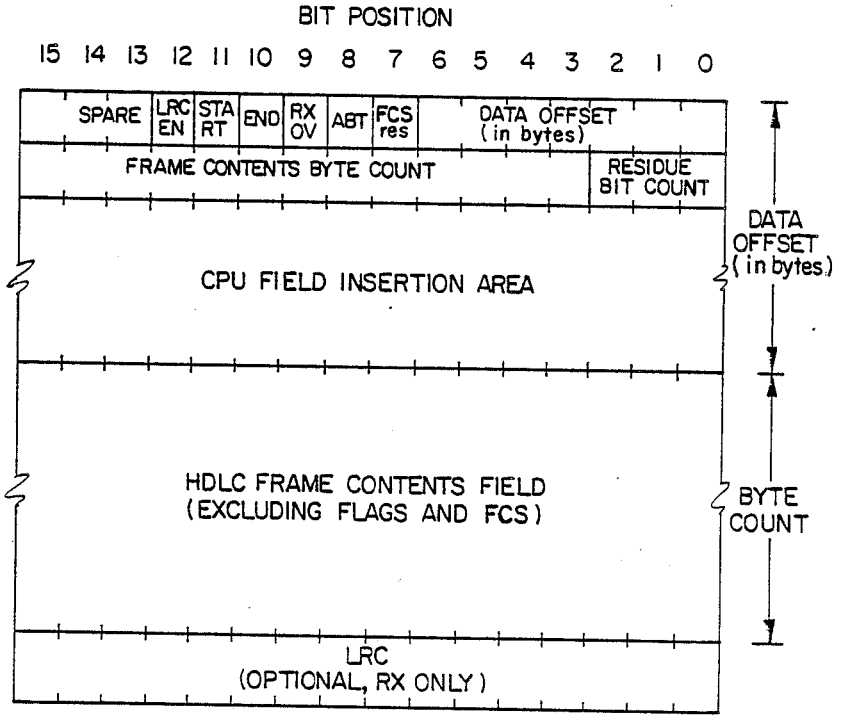
FIG. 7 illustrates a data structure in a frame buffer resident in a RAM in FIGS. 4*a* and 4*b;*

A frame buffer data structure is shown in FIG. 7. A frame buffer has its first word, descriptor 1, beginning on a memory word boundary and followed by its second word, descriptor 2.

Descriptor 1

Descriptor 1 contains a data offset field which occupies the least significant seven bits of descriptor 1. The data offset field specifies a byte offset from the start address of the frame buffer where the message frame contents field begins. In the receive direction, this field is always a word offset (i.e. bit 0 will be "0") whose value is determined by the contents of a data offset register (described with reference to FIG. 24). In the transmit direction, the frame contents field can start on a memory byte boundary. It is not restricted to being word aligned as shown in FIG. 7. A data offset of less than two words (four bytes) is not allowed, since it would cause the frame contents field to overlap with the descriptor words. A frame check sequence (FCS) result occupies bit position 7 of descriptor and is used in the receive direction to indicate the status of the frame checking sequence (described with reference to FIG. 22). If "0" the FCS check was passed, if "1" the FCS check was failed. In either case, the complete frame contents reside in a frame contents field.

An abort ABT field occupies bit position 8 of descriptor 1 and is only used in the receive direction. If "1", an abort sequence "1111111" was detected inside the frame, causing the frame processor to abort reception of the frame. In the event of such occurrence, the frame contents field contains the portion of the frame which was received before the abort sequence was detected.

A receiver overflow RX OV field occupies bit position 9 of descriptor 1, and is only used in the receive direction. The frame processor will set this bit to "1" if an incoming frame fills the number of buffers specified by a predetermined maximum before the entire frame has been received. In this case, the frame processor aborts or concludes storage of the frame in its buffer space. The frame contents field thus contains the portion of the frame recovered up to that moment. If RX OV is "0", this indicates that the closing flag of the frame occurred before a full count in a maximum buffer count register was exceeded, and therefore the message was received successfully.

An end of message field END occupies bit position 10 of descriptor 1, and is set to "1" if the current frame buffer contains the end contents of a frame. In the receive direction, this bit will be "0" if the frame processor has filled the frame contents field of the current frame buffer without detecting the frame's closing flag. The frame processor will then fetch a new frame buffer field and continue to write the frame's contents, until the frame terminates with a closing flag or an abort. Alternately, in an extreme occurrence wherein a maximum allowable number of buffers per frame has been reached, this causes a receiver overflow. Hence the END bit is "0"the FCS result bit and descriptor 2 will not be valid. In this event, the frame processor 51 will not write descriptor 2, as the length of the buffer is assumed to be the maximum and a new buffer for the frame is presumed to follow. This is termed as chaining.

In the transmit direction, the END bit is set by the CPU to indicate to the frame processor that the frame does not continue in another frame buffer. There is no enforcement of maximum buffer counts per frame in the transmit direction. The frame contents field of a buffer can be any size as specified by a descriptor 2 regardless of whether or not chaining is employed.

A start of message field START occupies bit position 11 of descriptor 1, and if set to "1" indicates that the frame contents field of the frame buffer contains the start of a new frame. If equal to "0", this frame contains intermediate or end contents of the frame. A frame buffer with both the START and END bits set to "1" indicates that a complete frame is contained in the frame contents field of the frame buffer. A frame may be chained over a plurality of frame buffers. A frame which is chained over several frame buffers consists of an initial frame buffer having a START="1", END="0", followed by zero or more intermediate buffers with START="0", END="0", followed by a final frame buffer with START="0" and END="1". Any other sequence indicates a possible data loss on the associated channel.

In the transmit direction, START may be used to flag the start of a new frame, however, the frame processor transmitter circuitry only looks at the value of the frame buffer END bits to determine when to start and end transmitted frames.

A longitudinal redundancy check (LRC) enable field occupies bit position 12 of descriptor 1. In the receive direction, all receive side frame buffers have this bit equal to the value of an "LRC" bit of an internal control register (not shown). Hence if the LRC is enabled for all receive side channels, this field will be "1" in all receive side frame buffers, and "0" if LRC is disabled. In the transmit direction, this bit is used to indicate that the LRC is to be computed on the outgoing message. Hence, if a message is chained over several buffers, all buffers associated with the message have the same value in the LRC enable field.

There are three spare bits, occupying bit positions thirteen through fifteen of descriptor 1. These are unused by the frame processor. They are written as zeroes by the frame processor in the receive direction, and are ignored in the transmit direction.

Descriptor 2

Descriptor 2 is a sixteen-bit value for specifying the size of the frame contents field. It includes a frame contents byte count thirteen bit field which specifies the number of complete bytes in the message frame contents field. This is followed by a residue bit count three bit field that occupies the least significant bit positions of descriptor 2. It indicates that there is zero to seven bits of message data in the frame contents field in addition to those accounted for in the frame contents byte count.

A CPU field insertion area follows the descriptor portions. Typical uses of this field include adding extended addressing information to the front of a message, or storing maintenance information to keep track of unacknowledged messages. The size of this field is determined for all receive side frame buffers by the data offset register (FIG. 24), and is determined for transmit side buffers on a per buffer basis based on the value of the data offset field (bits 0 to 6) of the descriptor 1. Its maximum size is one hundred and twenty-two bytes (sixty-one words) in the receive direction, and one hundred and twenty-three bytes in the transmit direction.

A message frame contents field follows the CPU field insertion area. This field contains all the frame information to be transmitted or which was received except for the opening and closing flags and the FCS. Its starting point is determined by the value of the data offset field and the base address of the frame buffer.

A logical redundancy check (LRC) field of sixteen bits appears in receive side frame buffers whose corresponding channels have the LRC enabled. The LRC field consists of parallel exclusive-ORing of the words in the frame contents field of the frame buffer. Since the last word of the frame contents field may contain from one to sixteen message bits, non-message bits in the last word of the frame contents field are zeroed to avoid corrupting the LRC. The LRC can be used to protect the message from software errors. If an incoming frame is chained over more than one frame buffer, the LRC will only appear in the frame buffer containing the end of the frame. The frame contents byte count and residue bit count in descriptor 2 do not reflect the presence of the one word LRC.

The LRC is used to protect a message from software errors while the message is in the shared memory and not protected by a FCS. When such a message is forwarded via the transmit side of a frame processor, the LRC is recomputed as the message is transmitted. If the parallel exclusive-OR of the words of the message contents field(s) and the LRC previously computed by the receive side is not zero, the frame processor will replace the FCS and the closing flag of the frame with an abort. The CPU 52 is responsible for updating the LRC of a message while it is in memory if the CPU adds additional words to the message.

Frame Content Justification and Alignment in Buffer Memory

The frame processor 51 interprets the words of the frame contents field with respect to the order in which they are received or transmitted at the bit stream interface as illustrated in the FIGS. 8 to 11.

In the receive side, encoded n-bit messages consist of the bits b1, b2, b3 . . ., bn which reside in a frame as shown in layer 2 of FIG. 3. The bit b1 is the first bit of the message received, followed by b2, b3 and so on. After the opening and closing flags and the FCS bits are stripped off, and any inserted zeroes are deleted, the illustrated k-bit message m1, m2, m3 . . ., mk remains. This is a subset of the general expression b1 . . . bn, and maintains the same relative bit order, that is m1 was received before m2. In order to support different processors as well as byte or word memory accesses by the CPU, the relative ordering of the least and most significant bytes within the words of the frame contents field is selectable. The selection is defined by specifying the BP (byte position) bit, in an internal control register (not shown). FIGS. 8 and 9 show how (m1 . . . mk) appear formatted into memory words in the message frame contents field of a frame buffer for different values of the BP bit. The word offsets shown along the right of the figure are relative to the frame contents field only not the frame buffer as a whole. The actual format of the last word of the frame contents field will of course depend on the number of bytes in the message. In general, words are filled in order of increasing word offset number. Within a word, the byte which was received first will appear in bit positions 0 through 7 if BP="0", and in bit positions 8 through 15 if BP="1".

In the transmit side, a k-bit message (m1 . . . mk), with m1 being the first bit of the message, is formatted into an encoded message (b1 . . .bn), with b1 being the first bit transmitted. If the frame contents field begins with a complete word, the outgoing message can be stored in the frame contents field as shown in FIGS. 8 and 9, depending on the value of the byte position BP bit. If the first word of the frame contents field only holds one byte of data, the first byte of data must be positioned as shown in FIGS. 10 or 11 depending on the value of the BP bit.

Overview of Oueueing Interface

Figure 12:
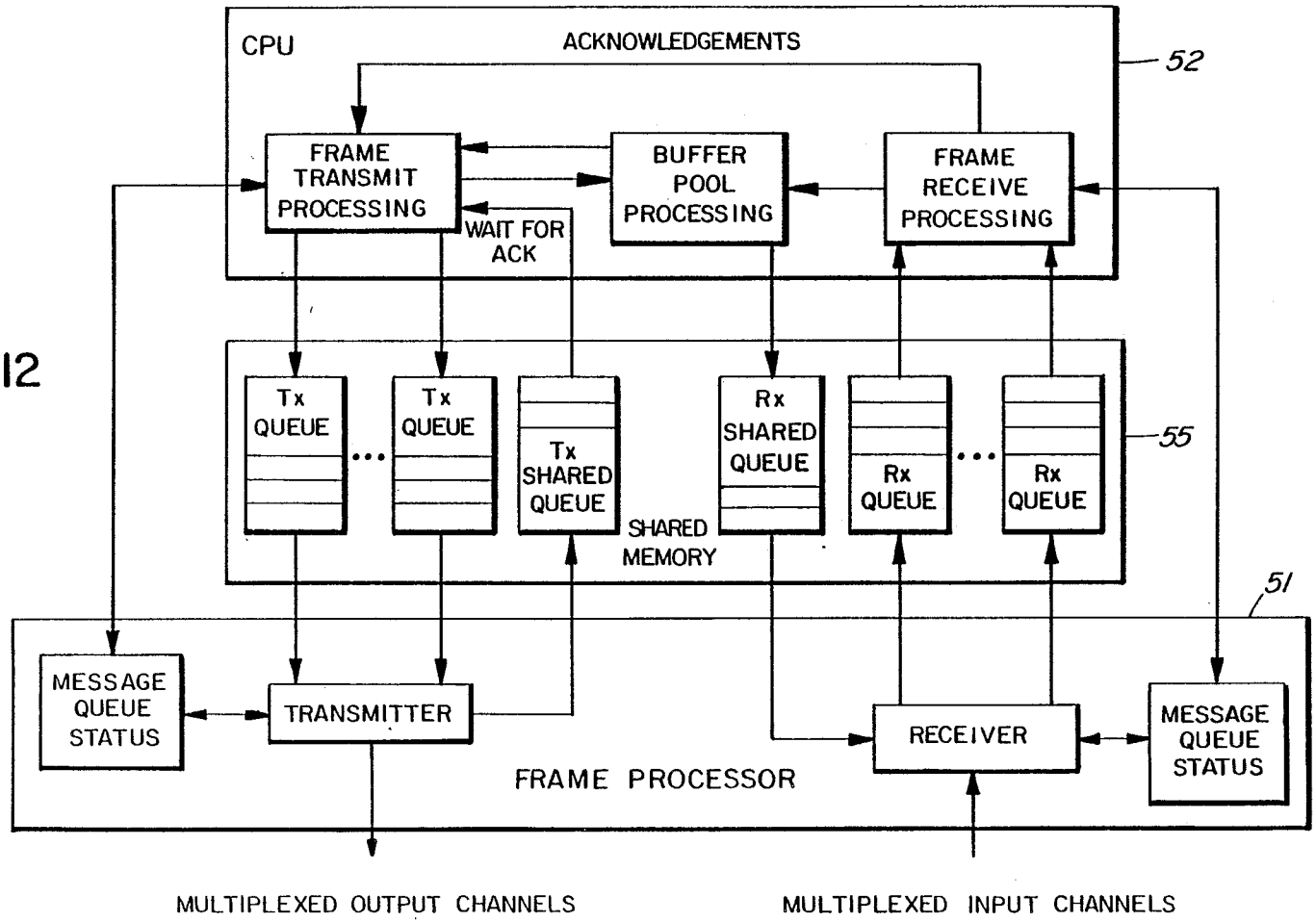
FIG. 12 illustrates a queueing interface used to communicate via the RAM in FIGS. 4*a* and 4*b;*

An overview of the queueing interface between the CPU 52 and the frame processor 51 is shown in FIG. 12. Queues and associated frame buffers are all located in the RAM 55 and the set of queues shown exist on a per frame processor basis, that is each frame processor maintains a separate queueing interface with the CPU 52. All queues contain sixteen bit buffer pointers. The physical twenty-two-bit base address of a frame buffer is obtained by concatenating six "0"s onto the least significant end of the buffer pointer. Hence, for example, if a pointer had a hex value of 32BF, descriptor 1 of the associated frame buffer would be found at address OCAFCO. A null value (0000) is used in all queues to mark empty queue spaces. There is one receive (RX) queue and one transmit (TX) queue, for each logical channel. The CPU 52 initialized these queues as empty, that is all nulls.

The receiver side of the frame processor recovers messages from multiplexed input channels and places the messages in message frame buffers in the RAM 55. Once the frame processor has completed work on a particular message frame buffer, for example when a message frame buffer becomes full, an end of message is found or an abort is detected, the pointer to the message frame buffer is placed in an appropriate RX channel queue. The CPU 52, acting as a consumer of the RX channel queues, retrieves the enqueued pointers and processes the correspondingly identified message frame buffers. As it removes pointers from the RX queues, the CPU 52 replaces the removed pointers with the null value, thereby freeing up elements of the queues for use by the frame processor.

A receive shared (RXS) queue is used to pass "free" buffer pointers to the frame processor. The CPU 52, acting as the producer for the RXS queue, attempts to keep this queue relatively full of pointers which point to message frame buffers available for use by the frame processor 51. The RXS queue is shared in the sense that it is used to acquire buffer pointers for any channel whose traffic requires the use of a new frame buffer. As a consumer of the RXS queue, the frame processor overwrites each buffer pointer removed from the queue with the null value.

The TX queues are used by the CPU 52 to pass pointers to message frame buffers to the frame processor 51 for transmission of messages contained therein across the T1 output channels. A frame processor 51 is a consumer for these queues, and thus overwrites consumed pointers from these queues with the null value.

A transmit shared (TXS) queue is used by the frame processor 51 to return used message frame buffer pointers to the CPU 52, that is those pointers which identify corresponding message frame buffers which have had their contents completely transmitted by the frame processor. The CPU 52 acts as a consumer for the TXS queue, and overwrites consumed pointers with the null value. A frame transmit processing task in the CPU 52 holds on to these used pointers for a time so that the buffer contents can be retransmitted in case the original transmission was not acknowledged. When a transmitted message is acknowledged via a received message, the associated message frame buffer pointer is available for re-use.

The frame processor 51 operates in accordance with the various queueing condition occurrences. For example, the frame processor 51 only removes a pointer from the RXS queue when there is at least one empty element in the RX queue for which the pointer is destined. The frame processor 51 does this by reading the queue at an element position where it would normally insert the new pointer. If the reading is not the null value, the queue is full. If the reading is the null value, the RX queue has at least one free element position to which the pointer from the RXS queue is subsequently written.

The frame processor 51 checks to see if an RX queue is full when it detects an opening flag in the associated channel bit stream. If the RX queue is full, the message is abandoned and the bit stream is searched for a new start flag. On start, a flag is defined as a flag followed by eight bits which contain neither a flag nor an abort pattern.

If a null pointer is pulled from the RXS queue, an "RX Shared Queue Empty" error is flagged, and the current frame is abandoned. The frame processor 51 then scans the associated channel bit stream for a new starting flag.

If the TXS queue is full, the TXS queue is allowed to be prematurely overwritten. No checking is performed on the TXS queue to see if it is full before writing a used pointer to it. If the CPU 52 allows this queue to fill up, the frame processor 51 overwrites pointers in the queue with the pointers of more recently transmitted frame buffers.

Upon initialization, the frame processor 51 set all of its channel queue and shared queue pointers to the base address of the respective queue. Subsequent queue element addresses are obtained by incrementing a queue pointer counter (**163*b* in FIG. 24**), the output of which provides the least significant bits of the queue address.

Figure 13:
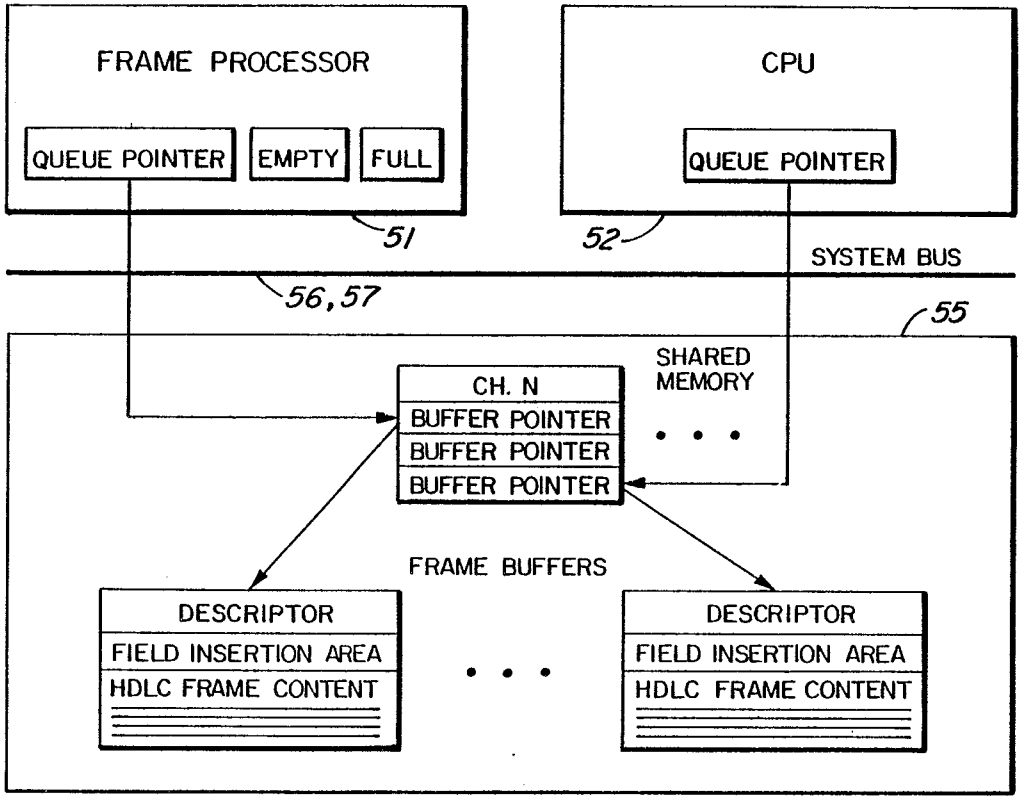
FIG. 13 illustrates a structure of receive (RX) and transmit (TX) channel queues used in FIG. 12.

FIG. 13 shows the structure of the RX and TX channel queues. Each queue is implemented as a circular array with elements consisting of sixteen bit pointers pointing to message frame buffers. Both the CPU 52 and the frame processor 51 maintain queue pointers into each queue, so that each may insert or remove elements based on their producer and consumer algorithms. The frame processor 51 maintains two status bits per channel queue—a queue full bit and a queue empty bit. These bits are read and updated by both the CPU 52 and the frame processor, allowing a high level means of communicating queue status information between the two entities.

Figure 14:
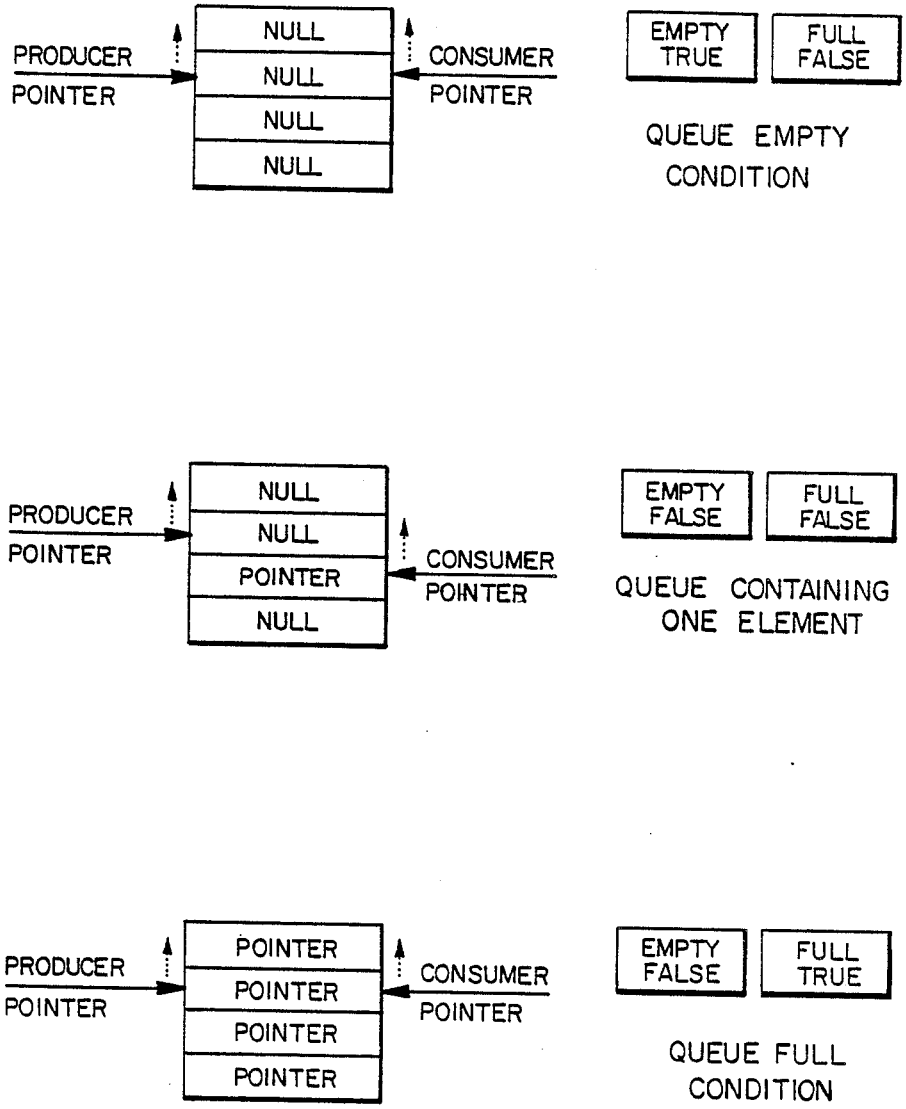
FIG. 14 illustrates three possible states of a channel queue in FIG. 13.

FIG. 14 shows the three possible states of a channel queue, and the corresponding values of the queue status bits. The channel queue status bits are used to determined if a queue is empty, full, or neither empty nor full. The middle of FIG. 14 shows a queue with one element position occupied by a pointer and is representative of this latter condition.

Queue Access Algorithms

This section defines the frame processor and CPU queue access algorithms in terms of state diagrams in FIGS. 15 to 18. The access algorithms are required to ensure that the queue status bits reflect the true state of the RX and TX channel queues.

Frame Processor Queue Access Algorithms

Figure 15:
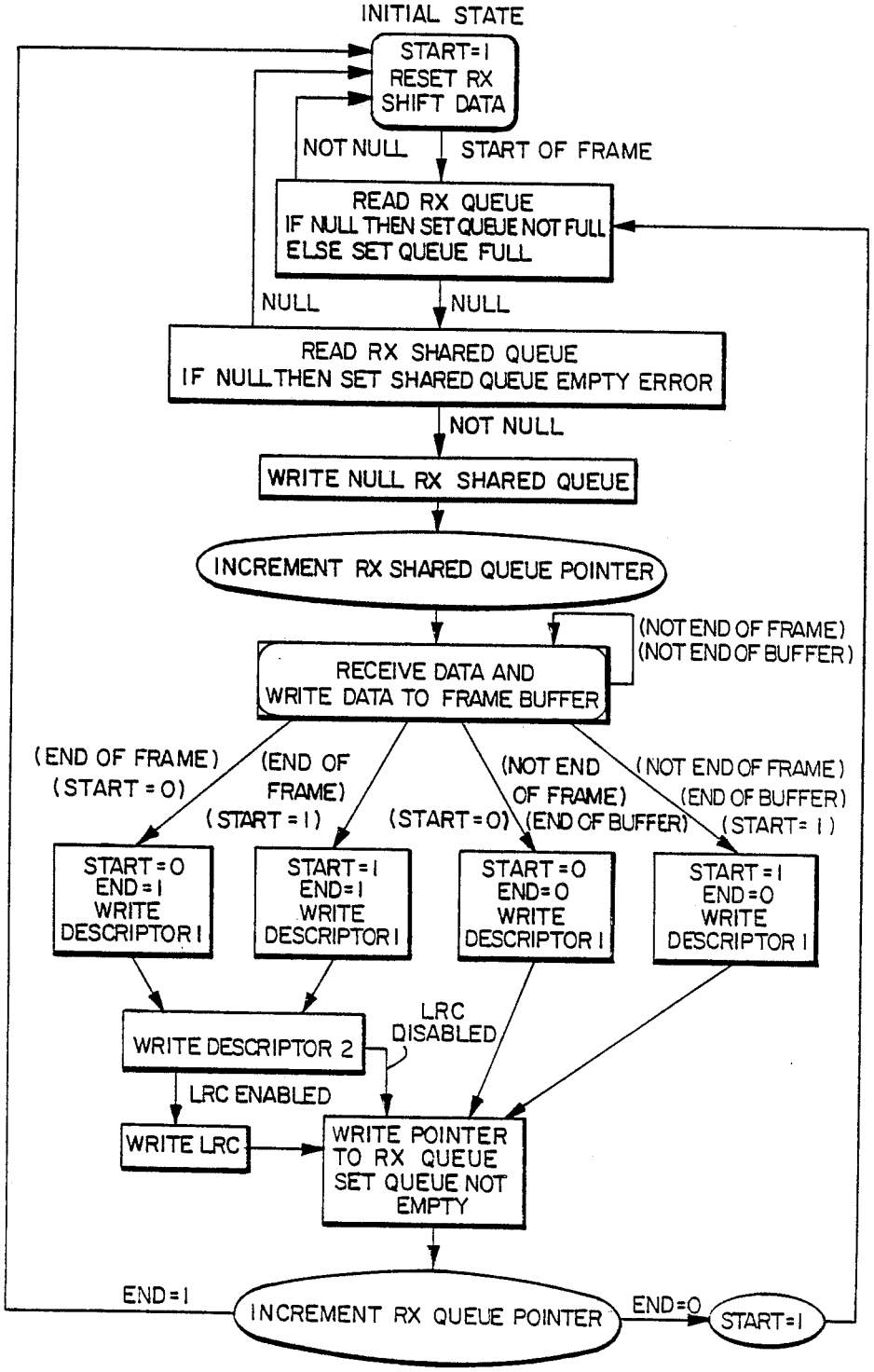
FIGS. 15 to 18 are state diagrams illustrative of frame processor and CPU queue access algorithms used in the D channel handler of FIG. 4*a;*
Figure 16:
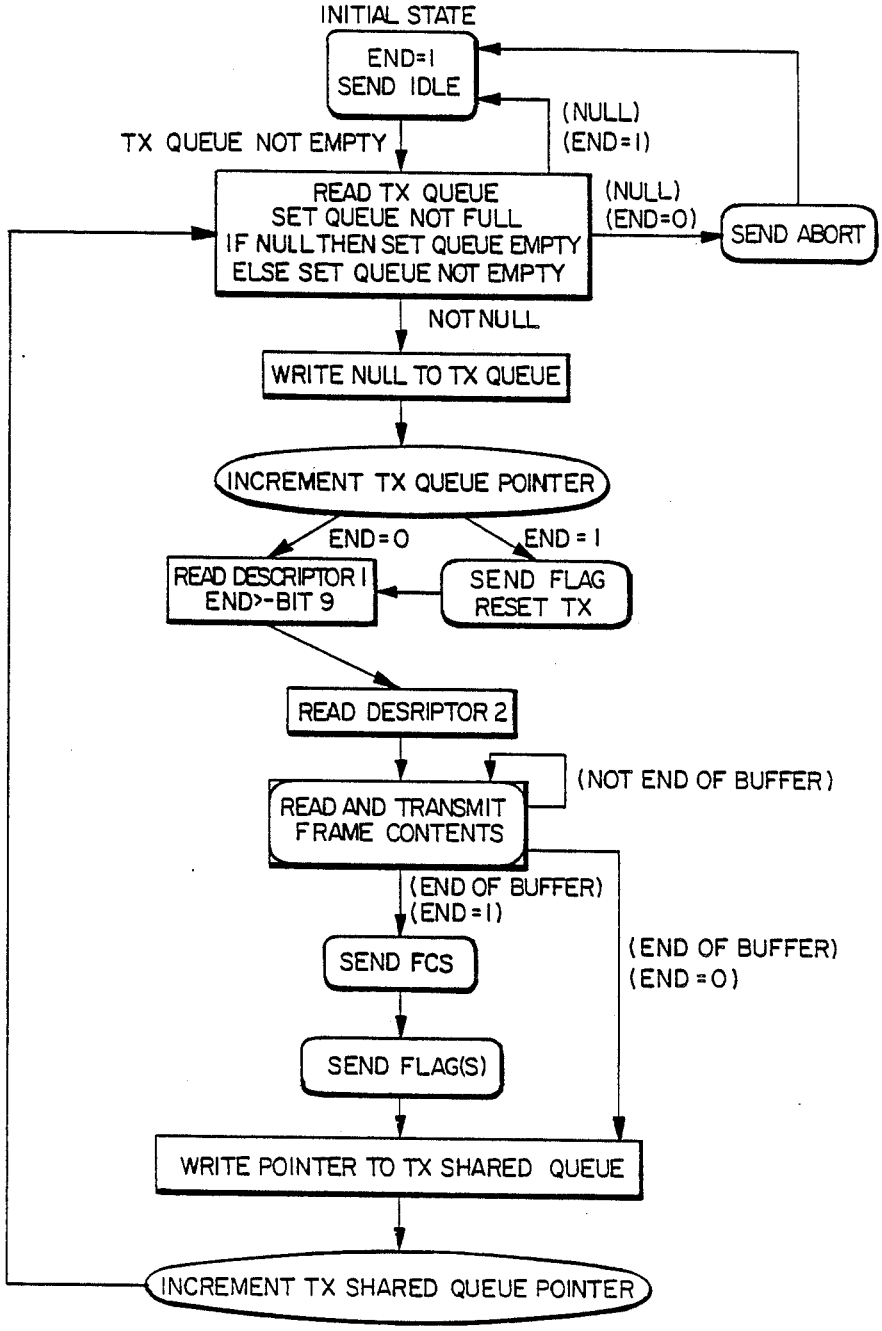

The state diagrams of FIGS. 15 and 16 illustrate the overall operation of the frame processor receiver and transmitter portions. The diagrams are intended to broadly convey selection and sequencing of functions by transmit and receive controllers in the frame processor. An exemplary structure of such a controller is not shown as such structures as are suitable for implementing the illustrated sequence of functions in the frame processor are merely a matter of convenient design choice for a person of typical skill in the art of digital electronics as applied in digital telephone systems.

The following state diagram notation is used in FIGS. 15 and 16. Rectangles with sharp corners are used to denote states in which shared memory accesses are performed by the frame processor. A shared memory access occurs during a single bus cycle. Hence the frame processor 51 updates queue descriptor bits during read cycles without interference from the CPU 52. Rectangles with rounded corners are used to denote bit stream operations. Ellipses are used to denote operations which do not fall into the above two categories, for example an internal counter increment. If a transition condition is not valid, the current state is re-executed. If a state has an explicit loopback transition, it is to highlight the fact that the work performed in the state may take a significant amount of time to complete, relative to the other states. The algorithms shown are applied as necessary to all channels supported by the frame processor.

A receive side queue access state diagram for the frame processor is shown in FIG. 15. When an opening flag is detected on a channel bit stream, an appropriate RX channel queue is read to determine if the queue is full or not. This updates the queue full bit for that queue. If the queue is full, the opening flag is ignored and a search for a new start of frame begins. This process continues until a start of frame and non-full RX channel queue are identified one after the other. At this moment, a pointer is read from the RXS queue so that the frame contents are placed in a frame buffer. If the RXS queue is empty, there is no room for the frame contents in the shared RAM 55, the frame is abandoned and the initial state returns. The pointer removal operation consists of three steps—read pointer, write null (effectively eliminating the pointer from the queue), and increment queue pointer. Acquisition of a message frame buffer pointer is followed by a retrieval of frame data from the channel of the bit stream storage in the message frame buffer. This involves both bit stream and memory operations.

When either the end of the message frame occurs or the message frame buffer is filled, the descriptors are written into the head of the message frame buffer. An end of frame can result from a stop flag or an abort flag being detected in the bit stream, or by a receiver overflow condition, in which case the end of message frame is forced by the frame processor. An end of message frame buffer occurs when the current frame buffer is full of data, resulting in data chaining. The value of the START and END bits written in descriptor 1 is indicated in each case. START is also used by the frame processor as an internal flag, indicating whether or not the current frame buffer is the first for the associated frame. Once the message frame buffer accesses are completed, the message buffer pointer is written to the appropriate RX channel queue and the RX queue pointer is incremented. The queue empty bit of the appropriate RX channel queue is only cleared when a pointer, whose associated message frame buffer contains an end of frame bit, is written to the RX channel queue.

A transmit side queue access state diagram for the frame processors is shown in FIG. 16. When a TX channel queue has a non-empty status, the TX channel queue is read to determine if the TX channel queue is empty or not. The TX channel queue may in fact be empty if a message frame buffer pointer removed previously was the last one in the TX channel queue. The pointer read updates the queue empty bit for that queue. If the TX channel queue was empty, the initial state returns. If a pointer was read, the queue status is non-empty and a queue removal operation is completed by writing a null to the location where the pointer was found and by incrementing the queue pointer. Based on the value of an internal END flag, the data in a new message frame buffer is assumed to be the start of a new message frame or a continuation of the one in progress. Either way, the END flag is updated to the value of the END bit in descriptor 1 of the frame buffer. Once the frame contents of the buffer are transmitted, the frame is followed by the FCS and closing bits, but only if the END bit is "1". The message frame buffer pointer is then returned to the TXS queue by writing it and incrementing the TXS queue pointer.

CPU Queue Access Algorithms

The state machine description which follow shows receive and transmit side algorithms for the CPU expressed to illustrate the principles involved rather than a detailed implementation. The sequence of queue accesses and queue descriptor bit updates is followed as shown, to ensure that the queue descriptors contain correct data. In the state diagram notation used in FIGS. 17 and 18, rectangles with sharp corners are used to denote states in which queues or frame buffers in shared memory are accessed by the CPU. Rectangles with rounded corners are used to denote CPU 52 accesses of the frame processor 51 to update queue status bits. Ellipses are used to denote operations which do not fall into the above two categories, such as internal register increments or accesses to memory private to the CPU 52. If a transition condition is not valid, the current state is reexecuted. If a state has an explicit loop-back transition, it is to highlight the fact that the work performed in the state may take a significant amount of time to complete, relative to the other states. The algorithms shown are applied as necessary to all channels supported by the frame processor 51.

Figure 17:
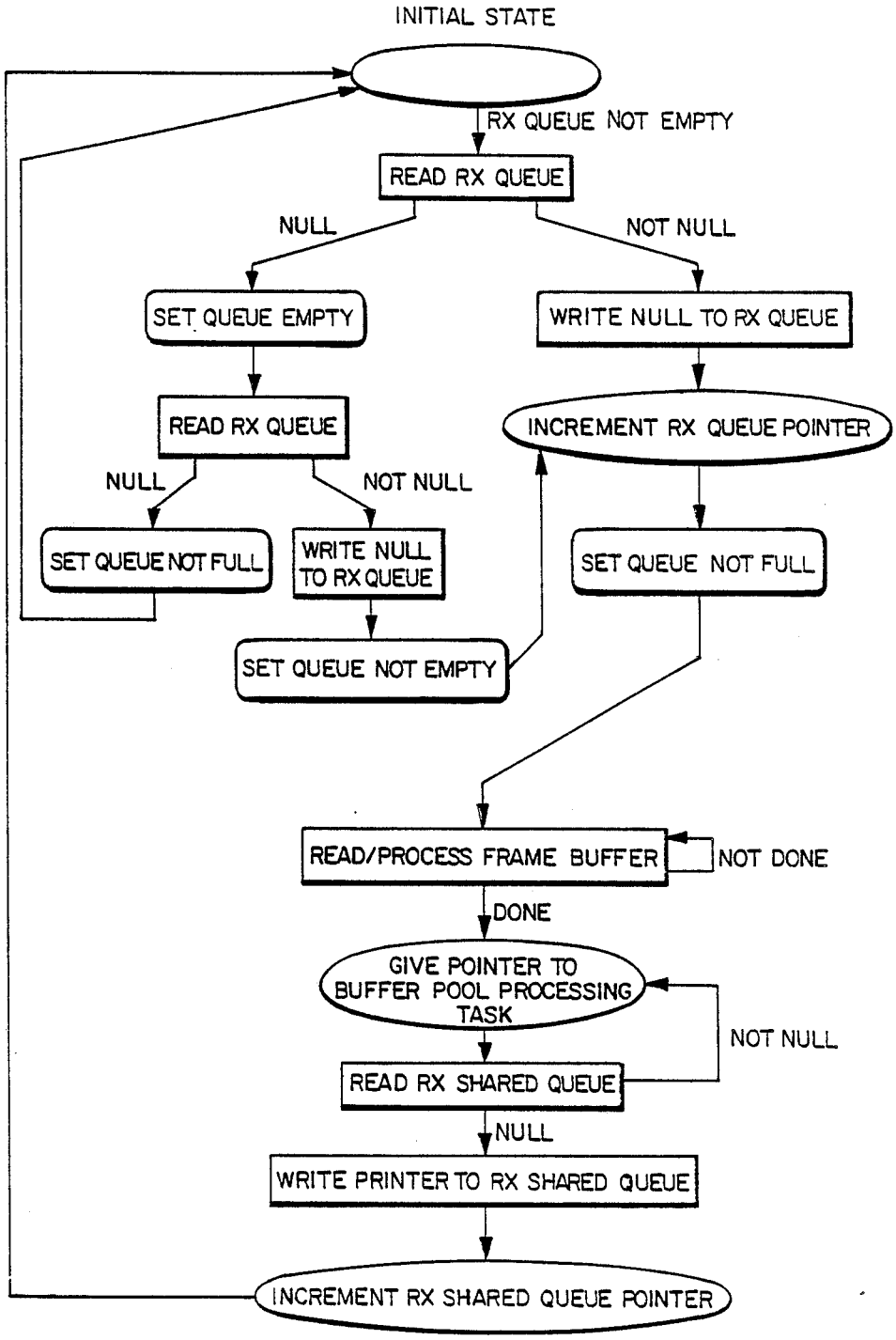

The receive side queue access state diagram for the CPU 52 is shown in FIG. 17. If an RX channel queue has a non-empty status, it is read, and if a message frame buffer pointer is obtained, the pointer removal operation is completed by writing a null value into the queue element position and incrementing the queue pointer. If a null value was read, the queue status is updated to empty, then the RX queue is read again to check if the frame processor 51 has inserted a message frame buffer pointer into the queue after the first read by the CPU 52. After this the CPU 52 will either return to the initial state or, if a message frame buffer pointer was found, complete the pointer removal operation. After an incoming message frame buffer is processed, the pointer to the message frame buffer is returned to a buffer manager in the CPU 52, which is responsible for maintaining an adequate supply of message frame buffer pointers in the RXS queue.

Figure 18:
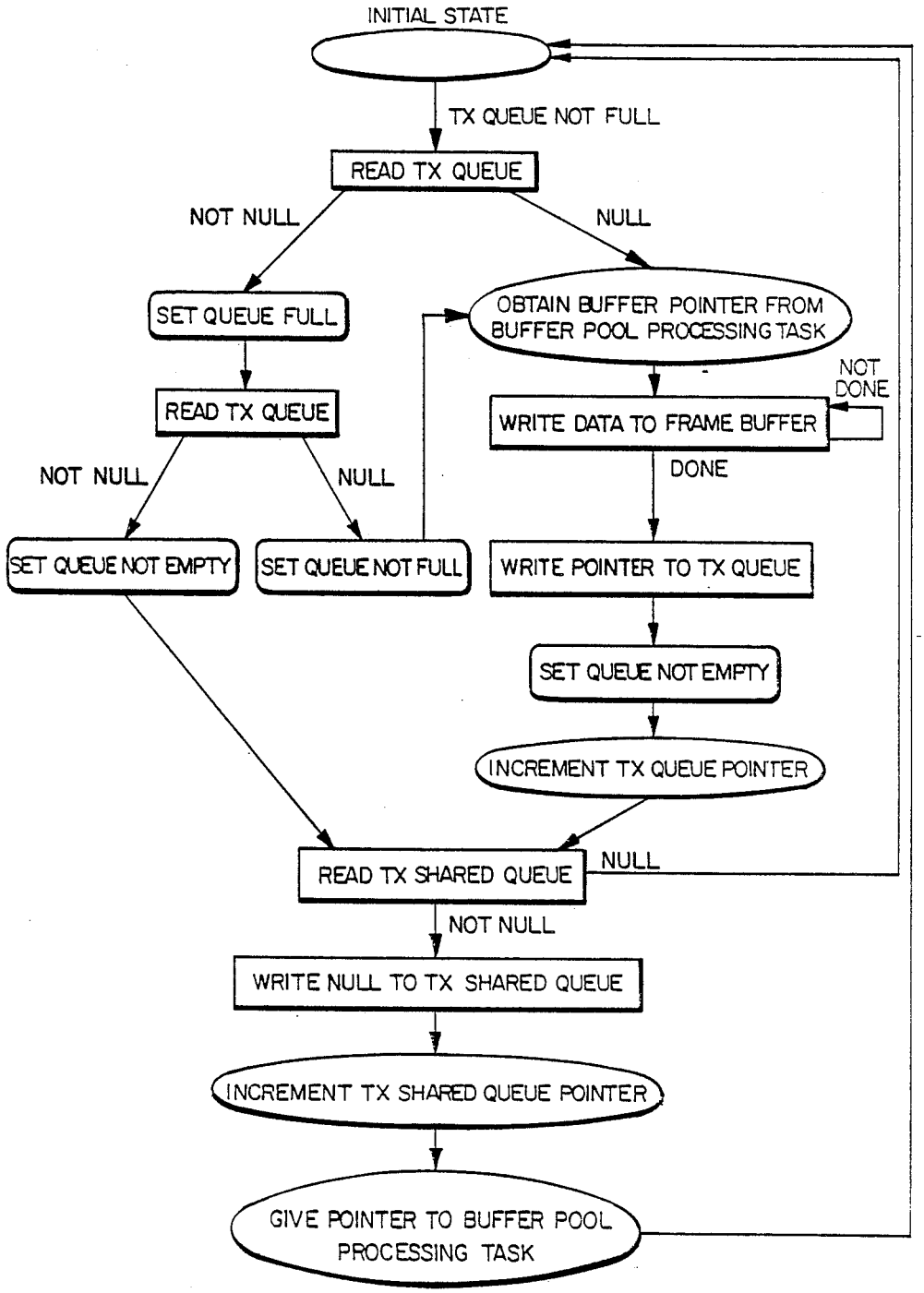

The transmit side queue access state diagram for the CPU 52 is shown in FIG. 18. If the CPU 52 has data for transmission on a particular channel, the CPU 52 reads the appropriate TX channel queue when the queue's status is non-full. Based on whether a message frame buffer pointer or a null value is read, the queue status will either be set to full or remain unchanged. If the queue status is set to full, the TX queue is read again after updating the status bit to check if the frame processor has removed a pointer from the TX queue. If a message frame buffer pointer is again read, the queue full status remains and the initial state returns. If a null is read, the queue is in a non-full state, and thus a buffer pointer is obtained from the buffer manager in the CPU 52 and data is placed in the associated message frame buffer. When this is completed, the message frame buffer pointer is inserted into the TX queue. If the message frame buffer associated with the pointer contains an end of message (END="1"), the TX queue status is updated to non-empty. The buffer manager in the CPU 52 is responsible for removing used message frame buffer pointers returned by the frame processor 51 from the TXS queue. This pointer removal procedure can also be performed, as shown, at the end of every channel queue insertion. The CPU 52 is responsible for ensuring that the TXS queue never overflows, since this would result in lost message frame buffer pointer and a consequent reduction of temporary storage capacity in the RAM 55.

The Frame Processor

The structure and internal functions of the frame processor 51 are discussed with reference to FIG. 19 which illustrates the major functional circuit blocks and with reference to FIGS. 20 to 27 which illustrate each of the functional circuit blocks in more detail. In the interest of emphasizing the structural and functional aspects of the frame processor 51, the provisions for power, ground, clock signals, control signals and timing signals are generally not shown in the FIGS. 19 to 27. However, the sequential timing aspects of the frame processor 51 are later discussed with reference to FIGS. 28 to 30 which are state diagrams illustrative of the operation of the frame processor.

Figure 19:
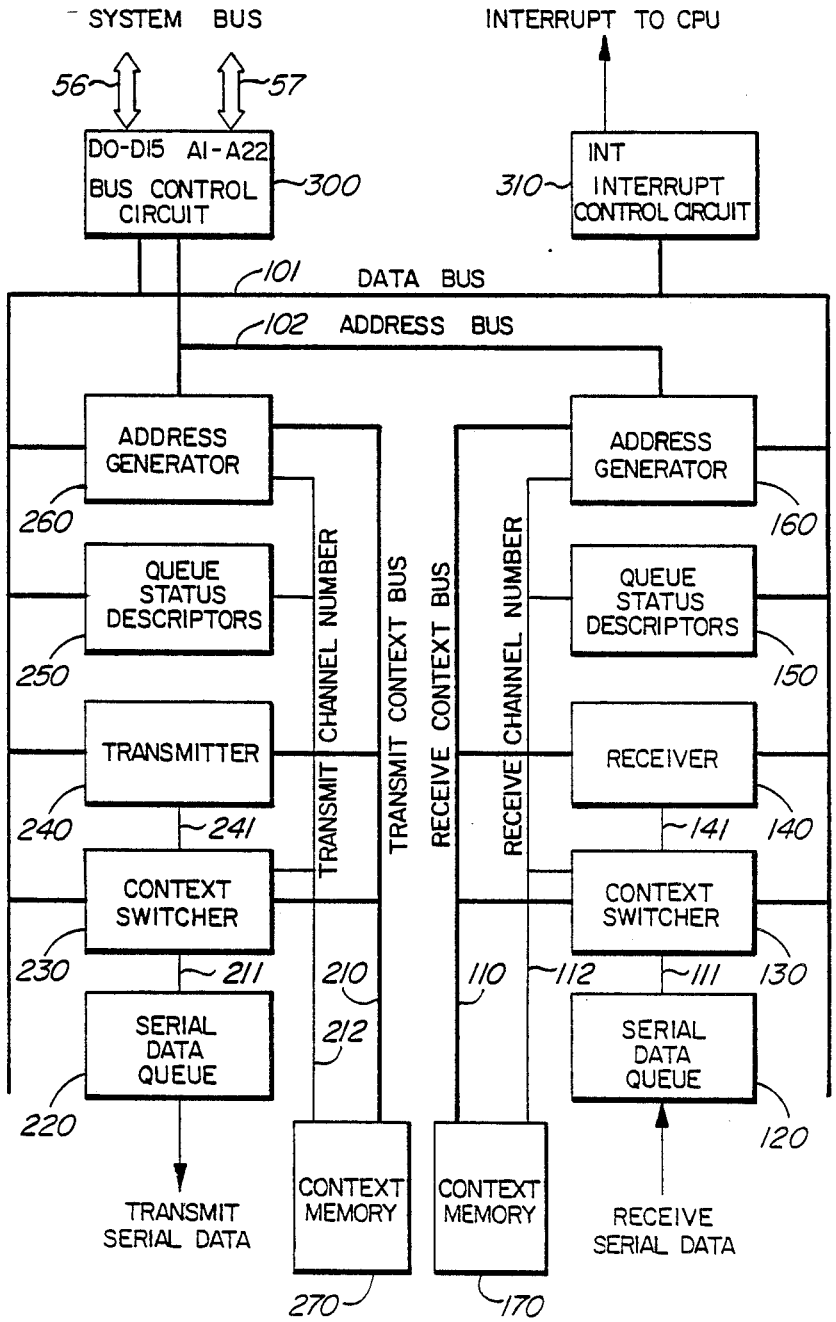
FIG. 19 is a block schematic diagram of a frame processor used in the D channel handlers in FIGS. 4*a* and 4*b;*

The frame processor in FIG. 19 includes a receive portion having circuit blocks and elements labelled with identifying numbers between 110 and 170 and a transmit portion having circuit blocks and elements labelled with identifying numbers between 210 and 270. The receive and transmit portions are connected via a data bus 101 and an address bus 102, common to both portions, to an interface circuit which includes a bus control circuit 300. An interrupt control circuit 310 is also connected to the data bus 101. The receive portion includes a serial data queue 120, a context switcher 130, a receiver 140, queue status descriptors 150, an address generator 160 and a context memory 170. The transmit portion includes similar elements which are similarly labelled with the distinction that the most significant digit is a "2". As the functional blocks of the transmitter and receiver portions are structurally similar, the following description is directed primarily to the elements of the receive portion, except where there are significant differences as for example between the receiver 140 and the transmitter 240.

Serial Data Queue

Figure 20:
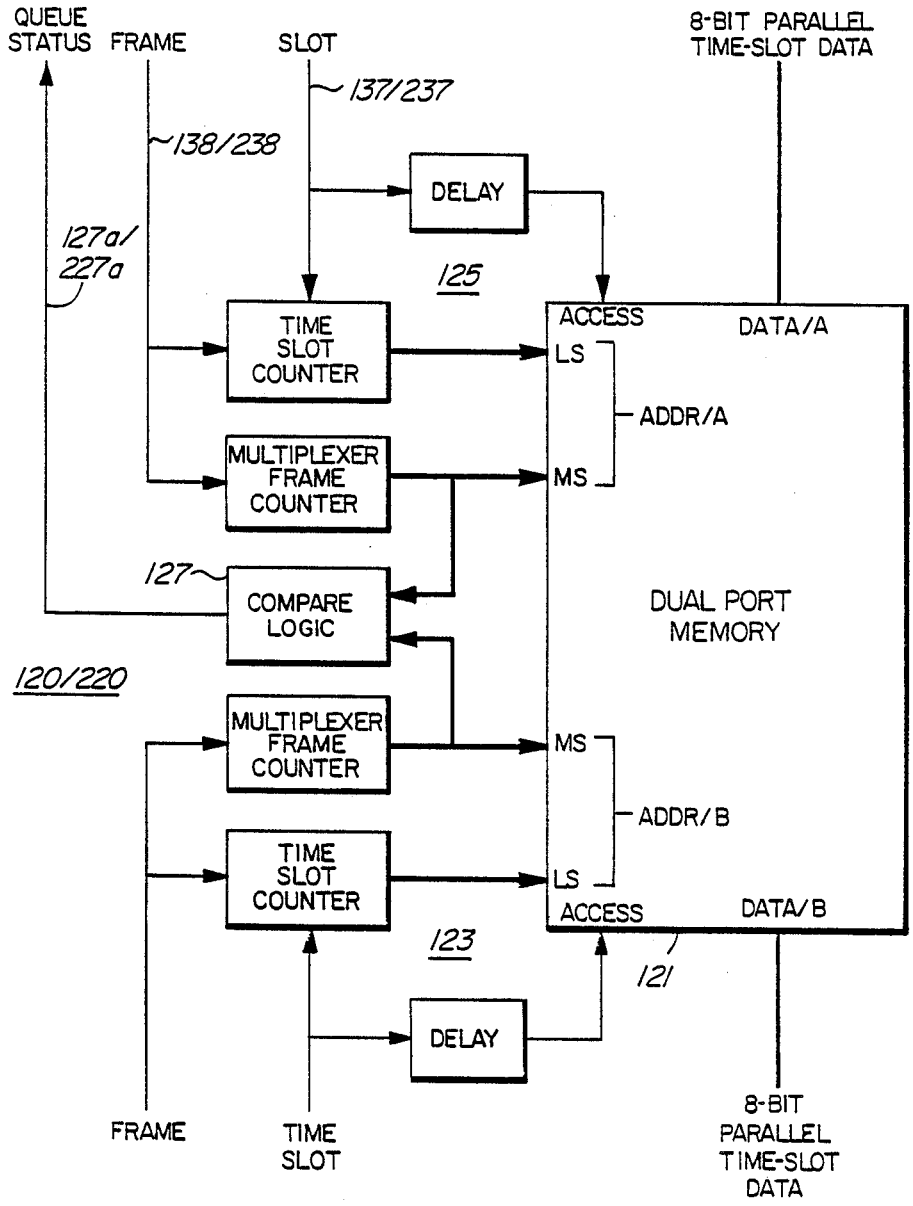
FIGS. 20 to 27 are block schematic diagrams which structurally illustrate functional circuit blocks shown in FIG. 19.

The serial data byte queue (120/220) in FIG. 20 is a dual port memory 121 arranged to receive bytes at a data port B and to transmit bytes from a data port A. An addressing circuit at 123 utilizes synchronous external frame and time slot signals associated with an incoming T1 bit stream, to operate the data port B. Another addressing circuit at 125 utilizes internal frame and byte slot signals which need not be synchronous. A compare logic circuit monitors the more significant bits of the addresses provided by the addressing circuits to provide indications of the fullness or emptiness of the dual port memory. These indications are useful in circuitry to be described later to accelerate or decelerate data flow via the data port A to prevent overwriting data not yet read and to prompt efficient data flow through the frame processor.

Although the same basic circuitry is used for both the queues 120 and 220 on the receive and transmit sides of the message frame processor, there are some functional differences. Namely, the message frame processor keeps the receive serial data queue 120 as empty as possible. A serial data queue status lead 127*a* when asserted represents a queue empty signal. In contrast, the message frame processor also keeps the transmit serial data queue 220 as full as possible. A serial data queue status lead 227*a* when asserted, represents a queue full signal. Of course the direction of received data flow is from data port B to data port A, that is opposite to the direction of the transmitted data flow which is from data port A to data port B.

Context Switcher

Figure 21:
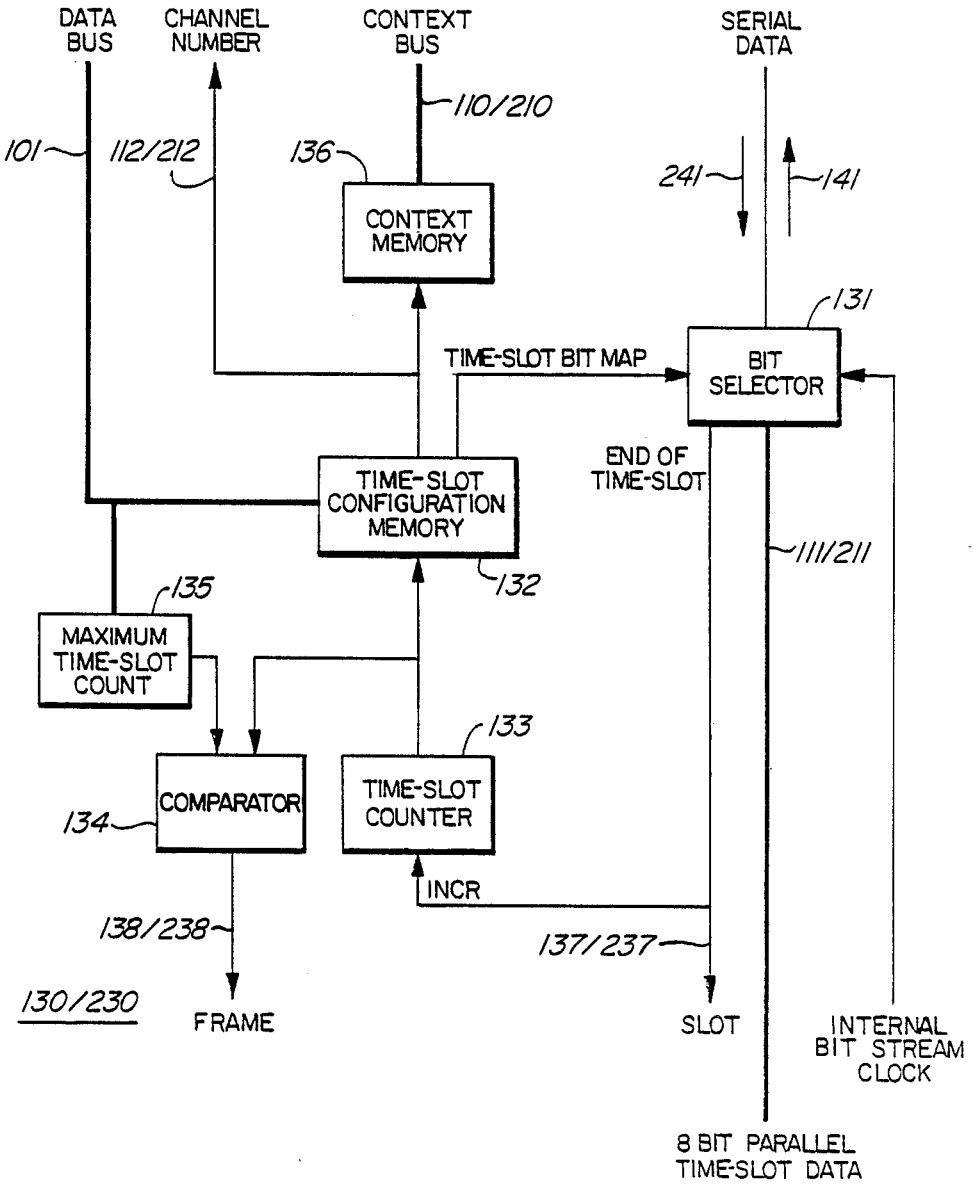

In FIG. 21, the context switcher (130/230) includes a bit selector 131 which is a serial/parallel converter being controllable to extract certain predetermined bit states from a byte stream 111 and insert these in a specified order into a serial bit stream 141. In the context switcher 230, the reverse operation is performed between a serial stream 241 and a byte stream 211.

The CPU 52 sets up the configuration of the time slots which includes specifying the time slot to logical channel mapping as well as the time slot bit map as was previously described with reference to FIG. 6. There is a configuration memory 132 having a separate configuration memory address location for each time slot. The configuration memory is addressed by a time slot counter 133. The configuration memory depth defines the maximum number of time slots that can be processed by the message frame processor. There are two outputs from the configuration memory 132; namely a channel number output 112/212, that maps a time slot into a particular logical bit stream, and a time slot bit map, which defines which bits contain data. The time slot bit map, in the memory 132, drives the bit selector circuit 131 which contains the data of the time slot currently being processed. The bit selector circuit 131 hunts through the bit map using combinational logic to generate a data bit for every serial data clock pulse occurrence on an internal bit stream clock lead. In a receive process of generating data bits, this circuit 131 removes all unmapped bits. These bits correspond to unused bandwidth. This circuit also generates a slot signal 137/237 that indicates that all data bits in the time slot have been found. This causes the memory 121 to provide the next time slot. The slot signal is responsible for triggering all context switching operations. The time slots are identified by the time slot counter 133. The maximum number of time slots per multiplexer frame is determined by the value contained in a maximum time slot count register 135 which is controlled by the CPU 52. A comparator 134 generates a frame signal on a frame lead 138/238 in response to the content of the register 135 and the output of the time slot counter 133 being the same. A context memory 136 is addressed by the channel numbers generated by the configuration memory 132. Every channel requires separate storage in the context memory 136. The output of the context memory 136 maps onto every storage bit of context registers (not shown) in the frame receiver 140, the frame transmitter 240, the receive address generator 160, and the transmit address generator 260. The individual circuit context sizes in this example are summarized below. The width of the actual context memory provided must accommodate at least the sum total of the bits.

| | |
|---|---|
| frame receiver context | 84 bits |
| frame transmitter context | 44 bits |
| receiver address generator context | 42 bits |
| transmitter address generator context | 54 bits |
| TOTAL | 224 bits |

Frame Receiver

Figure 22:
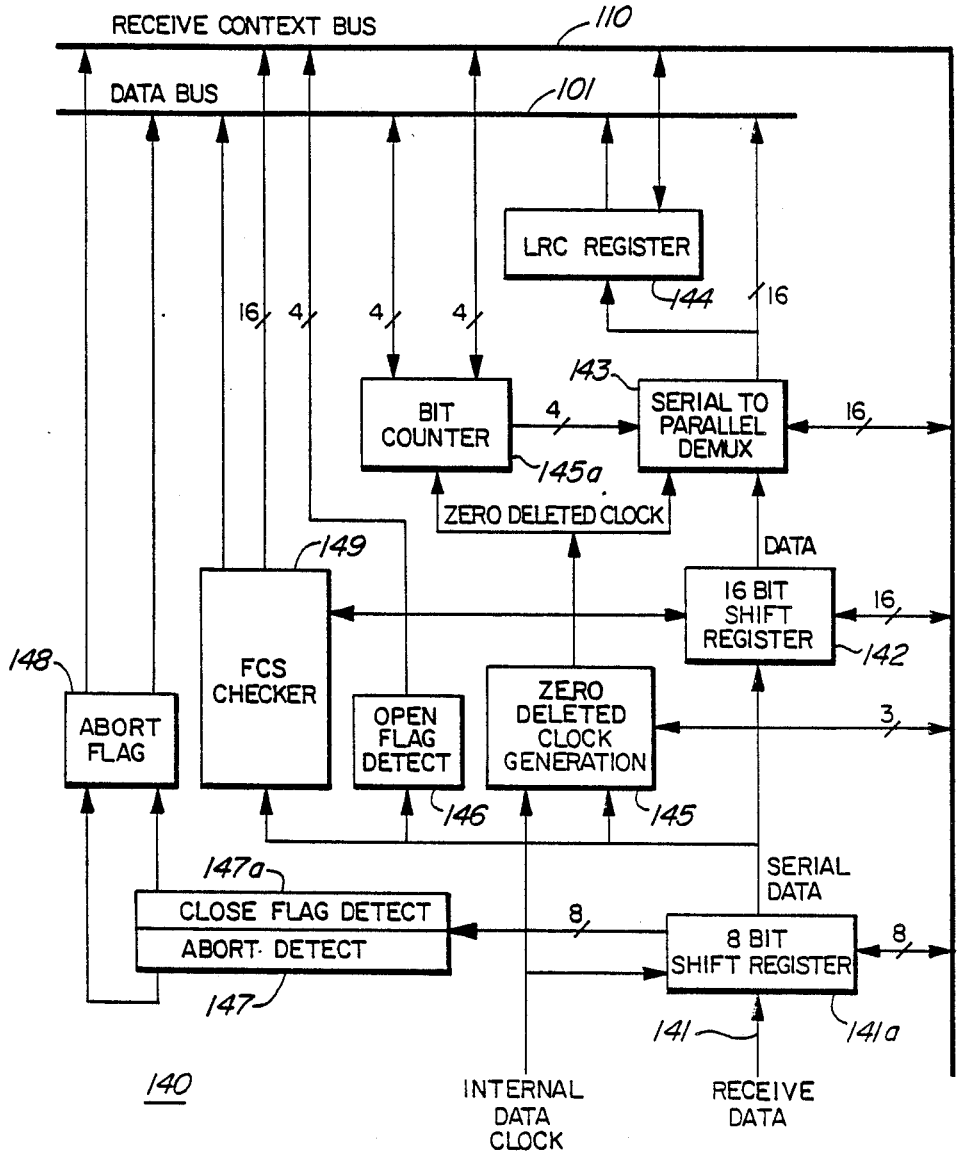

The frame receiver 140, in FIG. 22, gets serial data on the lead 141 from the context switcher 130 (FIG. 21). In FIG. 22 a connecting line with a slash across it and a number next to the slash indicates a plural lead conductor, the plurality of leads being indicated by the number. As flag and abort detection operations must occur before the bit stream has been modified in any way, the data is captured in an eight bit shift register 141*a*. Abort and close flag detect circuits 147 and 147*a*, each parallel monitor the contents of the shift 141*a*. An open flag detector 146 is connected, as shown, to monitor a serial output of the shift register 141*a*. An assertion of a signal at the output of the abort detect circuit 147 is used to terminate frame reception. An abort flag circuit 148 also responds by causing bit position 8 in descriptor 1 of FIG. 7 to be set to "1". The open and close flag detect circuits 146 and 147*a* both detect the standard 01111110 flag sequence, however they operate on different parts of the data which is delayed by the shift register 141*a*. This allows the signals to be correctly time aligned with a FCS register not shown in a FCS checker circuit 149, in order to provide FCS-reset and FCS-status-valid signals. The open flag detect circuit 146 generates an open flag detect signal to indicate that a D channelized message is potentially starting. This signal is asserted immediately before the first bit of the message enters the FCS checker circuit 149. Thus this signal is used to cause a reset of the FCS checker circuit 149. The close flag detector circuit 147*a* generates a close flag signal to indicate that the message currently being received is finished. When this signal is asserted, the last bit of the message has been shifted into the FCS checker circuit 149, and the FCS status is then valid.

The serial data bit stream must have any inserted zeroes removed before FCS processing and serial to parallel conversion. This is done in a zero deleted clock generation circuit by detecting a zero inserted condition, and deleting a clock pulse from the internal data clock pulse stream. This clock is referred to as the receiver zero-deleted clock and it drives subsequent stages in the bit stream processing. The serial data from the shift register 141*a* is delayed further by a sixteen bit shift register 142 before being converted from serial to parallel form in a serial to parallel demultiplexer 143. This allows the message frame processor to retain the FCS for every received message, without otherwise having to store it at the end of each message. The serial to parallel conversion operation must occur before the data can be written to a message frame buffer via the system data bus D0–D15. This function might well be normally implemented with a shift register however in this application, there is a problem which occurs whenever the length of the bit stream is not an even multiple of sixteen bits. This occurs when there is an odd number of bytes or when there are residual bits in the message. If a shift register is used, the bits will not be justified to the least significant position since the bit stream must be shifted in from the most significant end of the shift register. A technique that avoids this problem is to use a bit counter 145*a*, that is clocked by the receiver zero-detected clock, to address the serial to parallel demultiplexer 143 that loads a parallel register array of internal flip-flops (not shown) in the required order. The advantage of this technique is that the bits are directly loaded into the parallel register one bit at a time without shifting, and all the bits are always justified to the least significant position. The number of residual bits is contained in the bit counter 145*a* when the frame processor senses a flag detect condition. A word counter 162*b* in FIG. 24 and a bit counter 145*a* (FIG. 22) are concatenated and written to descriptor 2 in the message frame buffer data structure, previously discussed. This concatenated quantity specifies the total number of bits in the message, of which the least significant three bits are residual bits.

The FCS checker circuit 149 is a serial circuit that implements an FCS-CCITT standard. The output of the FCS checking circuit 149 is a binary signal and is used to update the FCS status field in the descriptor of the message buffer data structure. This information is passed along with the contents of the message frame buffer to the CPU 52.

A Longitudinal Redundancy Check (LRC) generator 144 performs a parallel parity check on the data being written via the data bus 10l. The output of the LRC generator is written to a message frame buffer in the RAM 55 as the last word of a message when the CPU 52 has enabled the LRC feature. The LRC computation starts with all zeroes, and exclusive-OR's every subsequent data word to an internal LRC register not shown.

A receiver context bus 110 provides a link to every storage element in the frame processor in order to completely capture the context. The amount of context storage required for the frame receiver is summarized below:

| | |
|---|---|
| FCS register (149) | 16 bits |
| LRC register (144) | 16 bits |
| serial to parallel register (143) | 16 bits |
| data delay register (142) | 16 bits |
| bit count (145a) | 4 bits |
| open flag detect (146) | 4 bits |
| zero-deleted clock generation (145) | 3 bits |
| close flag/abort detect (via 141a) | 8 bits |
| abort flag (148) | 1 bit |
| TOTAL | 84 bits |

Figure 23:
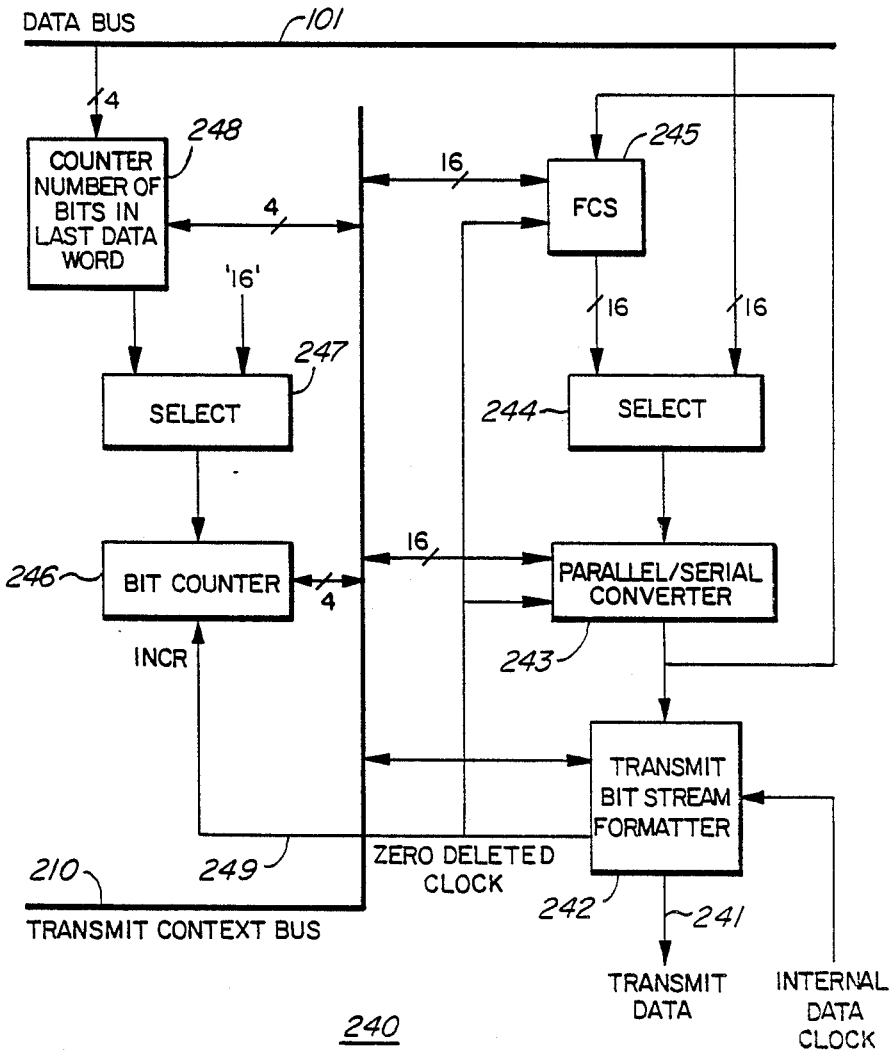

The frame transmitter 240, shown in FIG. 23, performs the function of transforming a message that is offered to the transmitter as a sequence of sixteen bit words, into a message frame format encoded bit stream on a transmit data lead 241. Plural conductor connections are represented in a manner similar to that in FIG. 22.

A transmit bit stream formatter 242 performs the functions of flag generation, zero insertion, abort/idle generation and transmitter zero-deleted clock generation. A transmitter zero-deleted clock 249 is an internal transmit data clock with removed clock pulses that correspond to the zero inserted bits. This clock therefore clocks only the data bits, and is used to clock a transmit data bit counter 246, a parallel to serial converter 243 and a FCS standard generator circuit 245.

The parallel to serial converter 243, in this example, is implemented with a shift register. In the frame transmitter, this is possible because all of the bits to be transmitted including residual bits have been justified to the least significant position by the CPU 52. There is one parallel bidirectional connection between the context bus 210 and the parallel to serial converter 210 and there are two parallel inputs to the parallel to serial converter 243, one which allows data words to be loaded from the data bus 110, and another which allows loading from an FCS circuit 245. The inputs are selected via a select circuit 244. The FCS circuit 245 implements the FCS-CCITT standard specification. The number of residual bits is specified by the least significant three bits of descriptor 2 in the message buffer data structure.

The transmit data bit counter 246 determines when a new word must be loaded into the parallel to serial converter 243. The counter is always loaded with the value of 16 (decimal) with one exception being a case when the message is not contained in an integer number of words. In this case, the number of remaining bits (1 to 15) is loaded into the bit counter 246. This occurs in three situations, when the data offset is an odd number and the byte count is an even number, when the data offset is an even number and the byte count is an odd number, and when there are residual bits to be transmitted.

As before mentioned, the transmit context bus is mapped onto every transmitter storage element in the circuit in order to completely capture the context. The amount of context storage required for the frame transmitter is shown below:

| | |
|---|---|
| FCS register (245) | 16 bits |
| parallel to serial converter (244) | 16 bits |
| last word bit count (248) | 4 bits |
| bit count (246) | 4 bits |
| bit stream formatter (242) | 4 bits |
| TOTAL | 44 bits |

Address Generator

Figure 24:
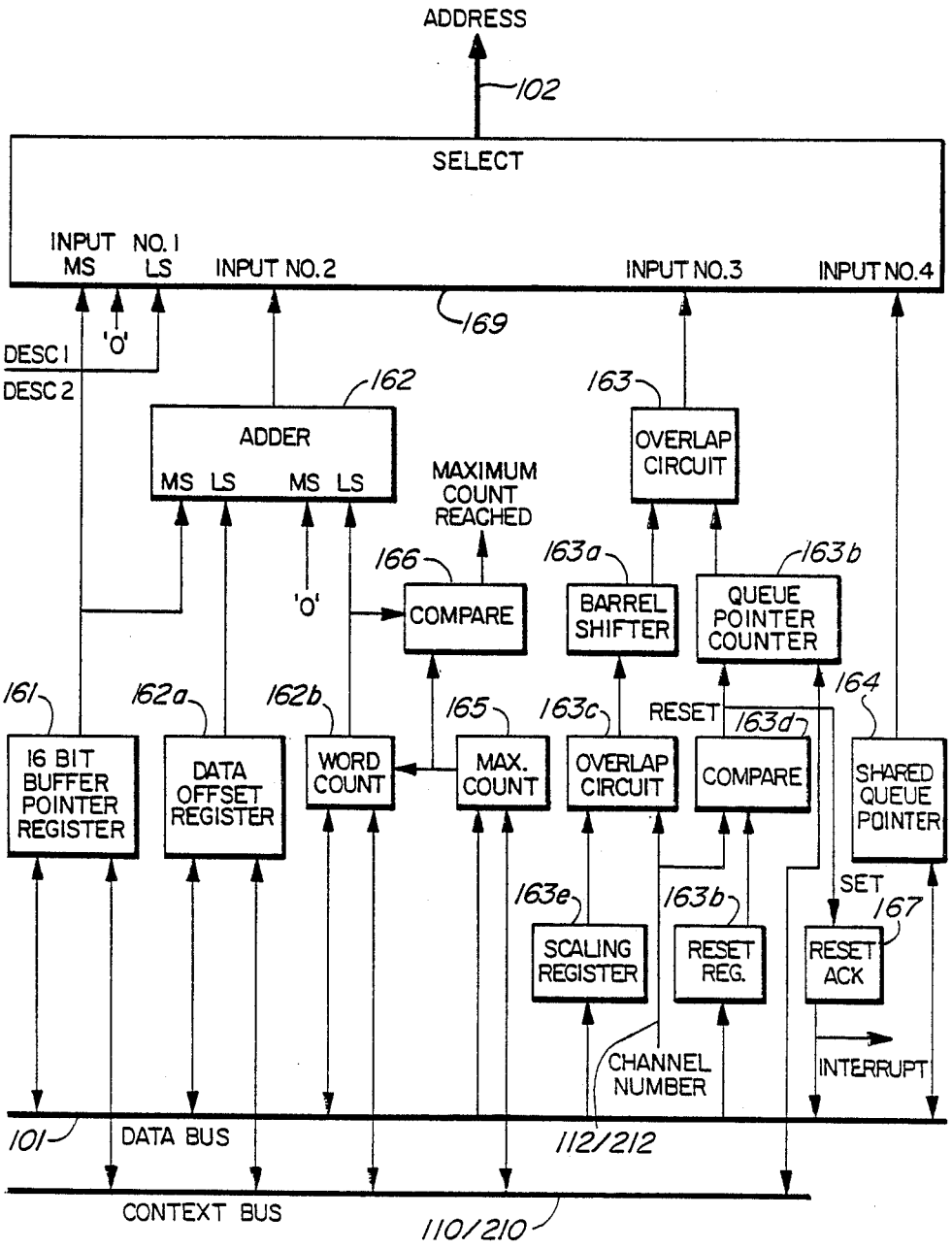

The address generators 160/260 are used in the transmitter and the receiver portions of the frame processor, and is shown in FIG. 24. The address generator can generate one of four different address types on the address bus 102 depending on which address input is specified to the select circuit 169.

A buffer pointer register 161 is connected to a selector input #1 and is used to generate a pointer to a message frame buffer. The buffer pointer register 161 is augmented with zeroes in the least significant bits of the address with the message frame buffer pointer occupying the most significant bits of the address. This address is used to load the descriptors for new message frame buffers. The least significant bit of this address is provided by the transmitter or receiver controller (not shown) and specifies either descriptor 1 or descriptor 2.

A message buffer memory mapper includes circuit elements 162, 162*a*, 162*b*, 165 and 166. The mapper is connected to selector input #2. The content of a data offset register 162*a*, is used in the memory mapper. This is a six bit word offset that is obtained from the most significant six bits of the seven bit byte offset specified in the message frame buffer data structure (FIG. 7). The content of a word count register 162*b* is obtained from the most significant twelve bits of the thirteen bit byte count specified in the message buffer data structure. This provides for a maximum buffer size of 4,096 words.

Contents of the maximum count circuit 165 and the word count register 162*b* are compared in a digital comparator 166. The word count is incremented until it matches the maximum word count which generates a maximum count reached signal. This signal indicates that the word count has reached its maximum allowable value and is used in two ways depending on whether the address generator is being used by a controller in the frame receiver or by a controller in the frame transmitter. In the receiver, the maximum count register 165 is set by the CPU 52 and represents the maximum size of a frame that can be received. In the transmitter, the maximum count register 165 contains the most significant twelve bits of the word count from the descriptor 2 word of the message frame buffer being transmitted. The content of this register is channel dependent, that is to say that it is variable with each channel, and therefore it is connected to the context bus 210 via a twelve lead bus 265.

A message queue pointer memory mapper includes circuit elements 163 through 163*f*, and is connected to a selector input #3. Overlapping of the content of a scaling register 163*e* and an instant channel number is implemented by masking out one or more of the most significant bits of the channel number in an overlap circuit 163*c*. The overlapping of the channel number from the overlap circuit 163*c* and the content of a queue pointer address counter 163*b* requires bit masking in an overlap circuit 163, and barrel shifting in a barrel shifter circuit 163*a*, in order to achieve a variable address space. A reset mechanism is required to compensate for the fact that the CPU 52 can only reset a particular channel while that channel is active with its context having been loaded into the registers of the address generator. The CPU 52 has the capability to reset the message queue pointer for a specific channel by loading the channel number into a reset register 163*f*. The output of the reset register 163*f* is continuously compared by a digital comparator 163*d*, to the channel number that is currently being processed. When a match occurs, the queue pointer address counter 163*b* is reset. The reset signal is also used to set an acknowledge signal in a reset acknowledge register 167, that informs the CPU 52 that the reset has been completed. The CPU then loads an unused channel number into the reset register 163*f* to enable the channel. Every time the reset register 163*f* is loaded, the reset acknowledge register 167 is cleared. The reset acknowledge signal is configured as an interrupt source in order to avoid requiring the CPU 52 to poll the reset acknowledge register 167 until the reset is completed.

A shared queue pointer circuit 164 is connected to a selector input #4 and is composed of a set of internal registers, not shown, that serve all the channels. The size of this pointer is selectable in order to allow the queue size to be varied. The most significant bits of the addresses generated by this pointer are specified by the CPU 52, in order to allow the queue to be placed anywhere in the address space.

As before mentioned, the context bus must be mapped onto every storage element in the frame processor in order to completely capture the context. The amount of context storage required for the address generator is shown below:

| | |
|---|---|
| buffer pointer register (161) | 16 bits |
| data offset register (162a) | 6 bits |
| word count (162b) | 12 bits |
| queue pointer counter (163b) | 8 bits |
| TOTAL | 42 bits (receiver version 160) |
| maximum word count (165) | 12 bits |
| TOTAL | 54 bits (transmitter version 260) |

Queue Status Descriptors

Figure 25:
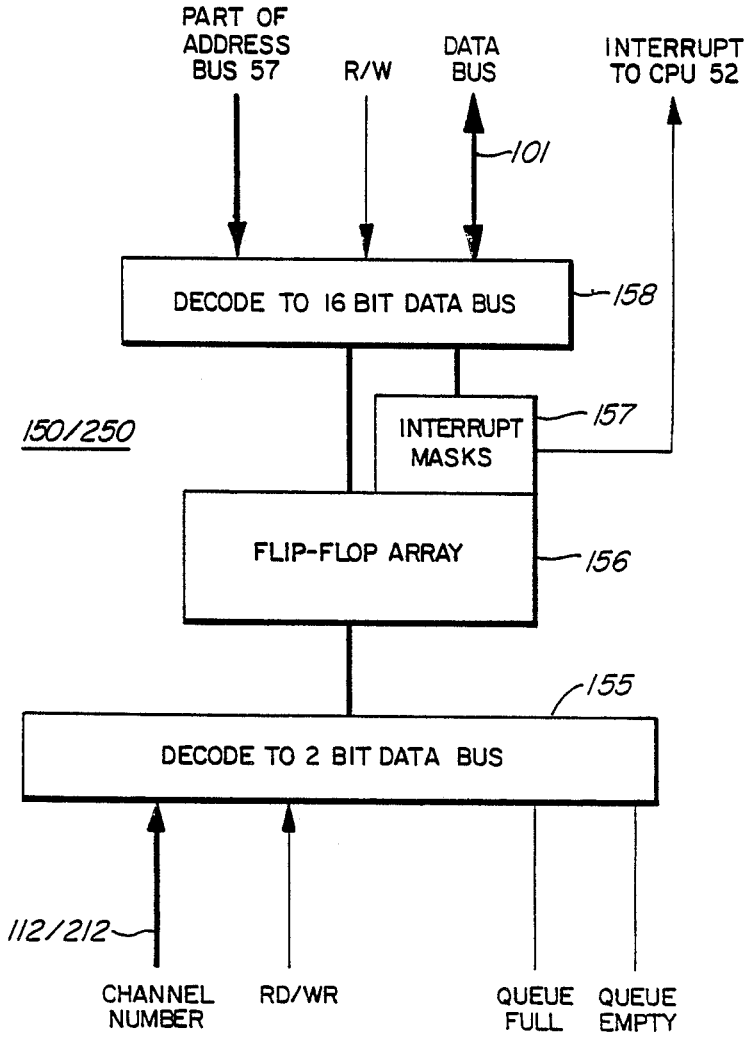

The queue status descriptors 150/250 are shown in FIG. 25. Each descriptor includes a dual ported array of flip-flops 156 that are accessible from the CPU 52 via a decode to sixteen bit data bus circuit 158, and accessible from the frame processor 51 via a decode to two bit data bus circuit 155. The CPU 52 is able to read the descriptors in parallel to make the queue polling operation efficient, and also is able to write one bit at a time. The ability to write one bit at a time eliminates the possibility of concurrent CPU processes interfering with each other. This requirement means that the decoding for read and write from the CPU 52 side are different one from another.

Each receive message queue has associated with it two signals that generate an interrupt signal, namely a queue not empty signal which indicates that the queue contains at least one element for processing and a queue full signal which indicates that the queue is near overflow.

Each transmit message queue has associated with it two signals that generate an interrupt signal, namely a queue empty signal which can be used to implement priority queueing schemes in the CPU by using a transmit queue depth of one to provide the CPU 52 with maximum control of transmit priority and a queue not full signal which indicates that the queue will accept at least one position.

Figure 26:
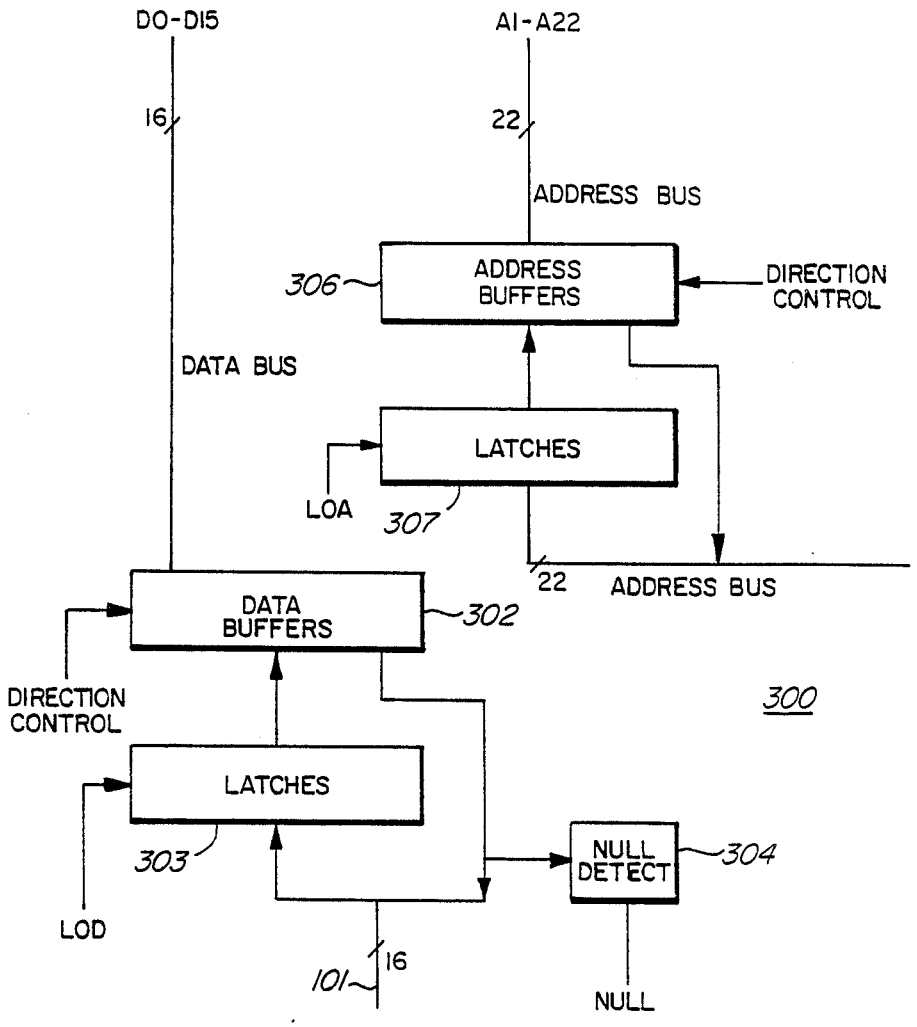
Figure 27:
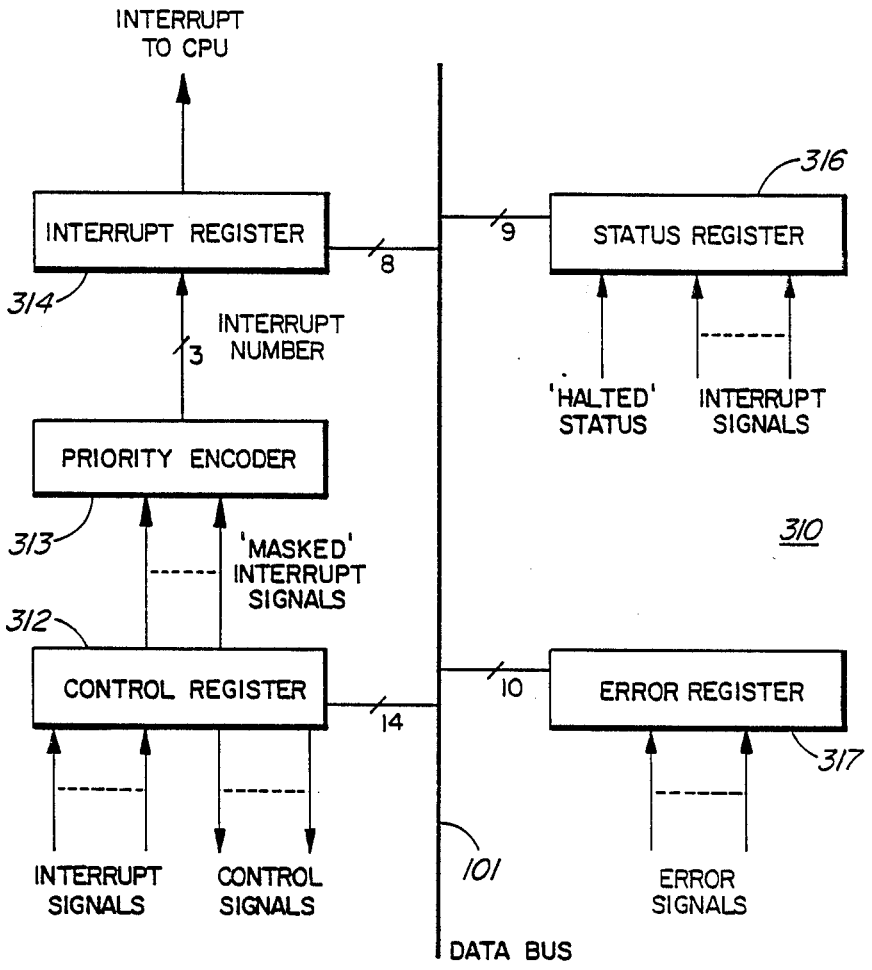

In FIGS. 26 and 27, plural conductor leads are shown in a manner similar to that in FIGS. 22 and 23. Bidirectional communication between the data bus 56 (D0–D15) and the data bus 101 is provided by circuit elements 302, 303 and 304, connected as shown in FIG. 26. Similarly bidirectional communication between the address bus 57 (A1–A22) and the address bus 102 is provided by circuit elements 306 and 307 connected as shown in FIG. 26.

Circuit elements 312, 313 and 314, in FIG. 27, provide for various interrupt priorities directed to the CPU 52. In addition, circuit elements 316 and 317 and the circuit elements 312 and 314 provide for various control functions of various of the elements of the frame processor as explained further in relation to FIGS. 28 to 30.

Control Flow

A discussion of the message frame processor control flow is separated into three components, namely:

1. Context switching, illustrated in the state diagram in FIG. 28;
2. Message receiving, illustrated in the state diagram in FIG. 29; and
3. Message transmitting, illustrated in the state diagram in FIG. 30.

Context Switching

Figure 28:
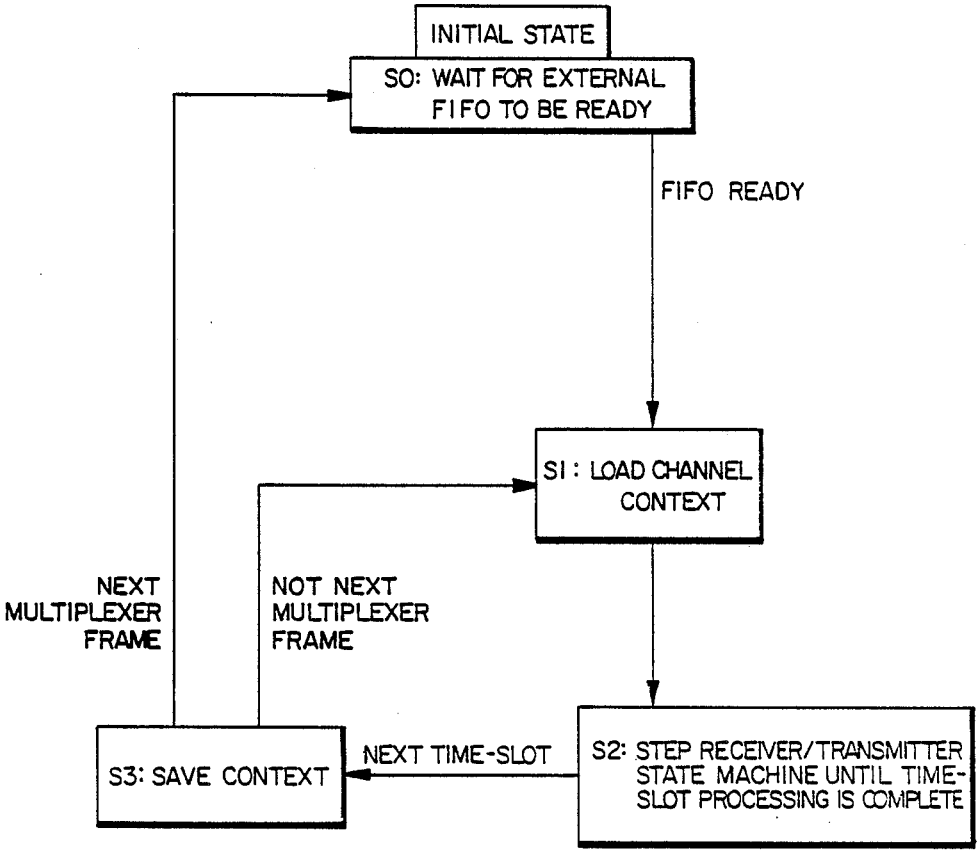
FIGS. 28, 29 and 30 are state diagram illustrations of the operation of the frame processor in FIG. 19.

The context switching state diagram shown in FIG. 28 defines how the message frame processor is shared between multiple channels.

State 0: In the receive context switcher, this state waits for multiplexer frame (i.e. T1 frame) to be inserted into the serial data queue to change the queue status from empty to not empty. In the transmit context switcher, this state waits for a multiplexer frame to be removed from the queue to change the queue status from full to not full.

State 1: The context for the currently active channel is loaded into the circuits connected to the context bus.

State 2: Data bits contained in a received time slot are shifted into the message frame receiver circuit (FIG. 22) via the bit selector 131 (FIG. 21), until the last data bit in the time slot is processed, which will be signified by the assertion of the next time slot signal. Transmitted data bits are serial loaded from the message frame transmitter (FIG. 23) via the serial data lead 241 into the bit selector circuit 131 until all of the specified bits for the channel time slots are in place.

State 3: The channel context is saved in the context memory 136 after the frame processor has finished processing a time slot. The context switching controller must check the queue status of the next multiplexer frame signal to see if the multiplexer frame has been completely received or transmitted or not. If not finished, the message frame processor loads the context of the next time slot in the multiplexer frame (state 1) otherwise the message frame processor returns to state 0.

Receiving

Figure 29:
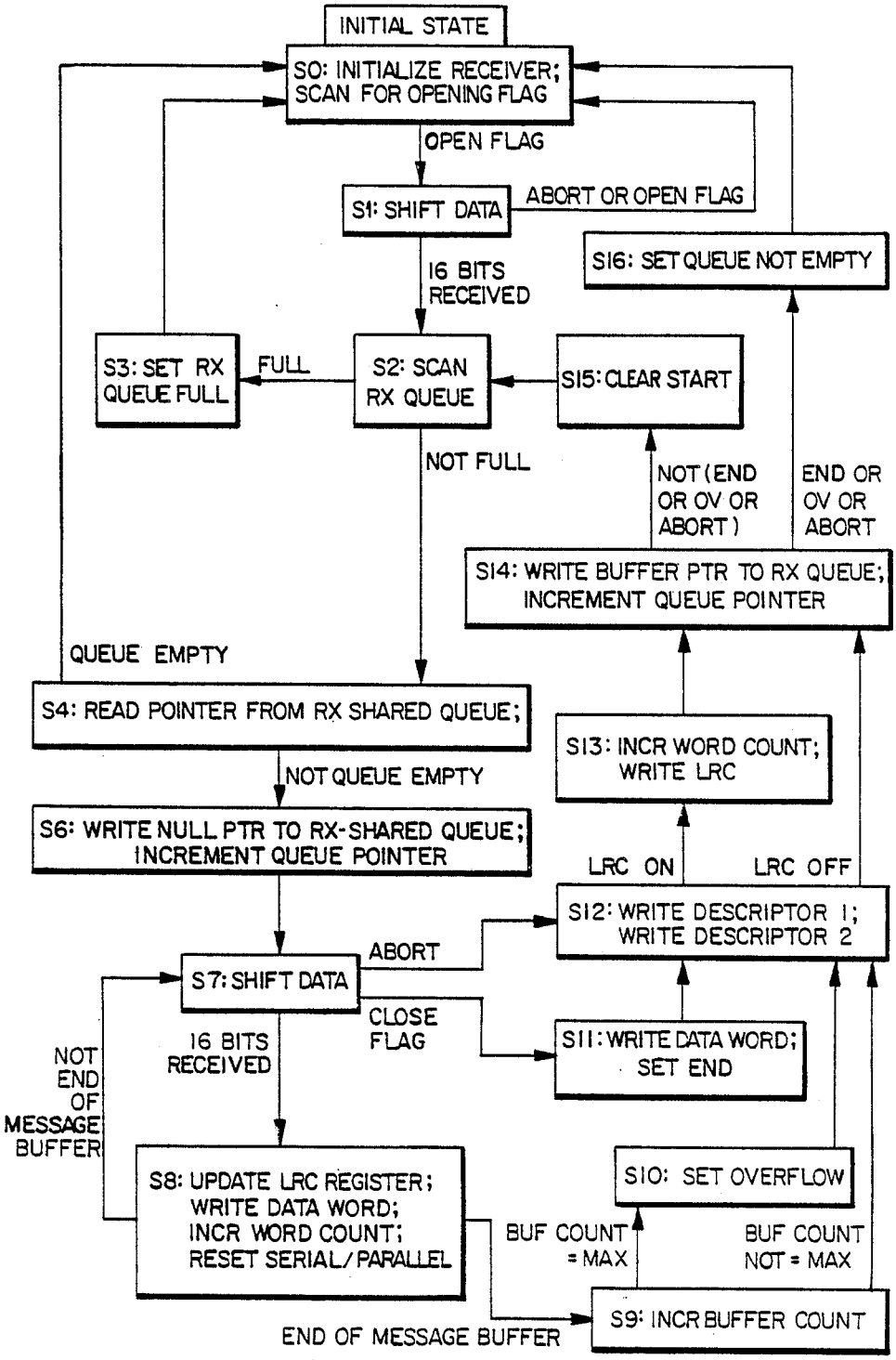

The receiver state diagram shown in FIG. 29 describes how the message frame receiver interacts with the frame receiver (FIG. 22), the receive address generator (FIG. 24), and the receiver queue status descriptors (FIG. 25).

State 0: The message frame receiver (FIG. 22) is reset in preparation for receiving a message. The receiver then starts to serially process the data bits, scanning for an opening flag indicating the start of a message. The receiver will allow two consecutive messages to be separated by a single flag, since the open flag detect circuit 146 is delayed by eight bits from the close flag detect circuit 147*a*.

State 1: Multiple flags will continuously reset the receiver, until sixteen bits have been received without detecting an open flag. When this occurs, the data delay register 142 will contain the sixteen received bits before they have been converted to a parallel format which will occur in 143. The same sixteen bits will also have been shifted through the FCS circuit 149 which was reset by the opening flag signal.

State 2: The message frame processor must prepare to buffer the incoming message in the shared system memory RAM 55. The first step is to ensure that the receive queue contains at least one NULL in which to store a POINTER to the incoming message. This is accomplished by scanning the receive queue to check whether the queue spaces contain at least one NULL. The scan operation involves a read of the RAM 55. In a scan operation the data bus is compared to the null value by the null detector 304. In the event of a null detect, the full bit of the queue status descriptor (FIG. 25) is set.

State 3: If the queue is full, the queue full status indicator will be set accordingly which will alert the CPU 52 that data is being lost for that channel. In this case, the remainder of the message will be discarded by the initial state 0 of the receiver.

State 4: If the queue is not full, then the receiver will obtain an empty frame message buffer by loading a pointer from receive shared queue (TXS). If the receive shared queue (TXS) is empty, processing will return to state 0 . This would be a very serious condition, because all subsequent message arrivals in all channels will be lost until more pointers to empty message buffers are placed in the receiver shared queue.

State 5: The frame processor must overwrite the shared queue location in buffer memory with a null value to indicate that the original message frame buffer pointer has been removed. The receive shared queue pointer is then incremented to point to the next element of the receive shared queue.

State 6: Received data bits are converted from serial to parallel until either sixteen data bits are accumulated, the message ends, or an abort condition is detected. If an abort is detected, the receiver then terminates the reception of the message immediately. The abort detect 147 sets an internal abort flag 148 that is written to the message buffer in descriptor 1 (FIG. 7) indicating that the buffer contains an aborted message.

State 7: The received data word (in 143) is used to update the LRC register 144, and then is written to the buffer memory RAM 55 using the message frame buffer address specified by the address generator 162 to **162*b* and 169). The word count (162*b*) in the receive address generator is incremented to point to the next location in the message frame buffer data structure (FIG. 7), and the serial to parallel conversion circuit 143** is reset.

State 8: If the end of the message frame buffer is reached before the message has been completely received, the data chaining mechanism will be invoked, and a buffer count will be incremented. The message frame processor continues to chain buffers together using the START/END (FIG. 7) mechanism until either the message terminates with a stop flag, the message buffer count for that message exceeds a preset maximum, or the message transmission is aborted.

State 9: If the maximum buffer count is exceeded, than the overflow flag RX OV (FIG. 7) is set to indicate to the CPU 52 that the overflow occurred. All subsequent data will be discarded.

State 10: If a close flag is detected, then the last data word is written to the message frame buffer. This word will contain from one to sixteen valid data bits which are indicated by the least significant four bits of descriptor 2 (FIG. 7) in the message frame buffer data structure. Cases when the last word in the message frame buffer contains a single byte of data as well as any residual bits will result in a bit count less than sixteen. The end of message (END) bit will be set to indicate that the message terminates in the current message buffer.

State 11: The two descriptors for the message buffer are written back to the shared memory RAM 55.

State 12: If the LRC option is enabled, then the word count 162 (FIG. 24) will be incremented to generate an address that points to the location following the last data word, and the contents of the LRC register are written to the message buffer. The byte count that is in descriptor 2 does not include the LRC.

State 13: The last operation to be performed for every message frame buffer is to signal the CPU 52 that data has been received. This is done by writing the buffer pointer (161) to the receive message queue (FIG. 12) for the currently active channel. The pointer for the receiver queue is then incremented to the next location.

State 14: If the message is still being received using the data chaining mechanism then the state machine will continue execution in state 2.

State 15: When the message reception has terminated, the CPU 52 is signalled by the setting of the queue status descriptor to indicate that the receive queue (FIG. 12) is not empty. The receiver will then re-enter state 0 in preparation for the next message.

Transmitting

Figure 30:
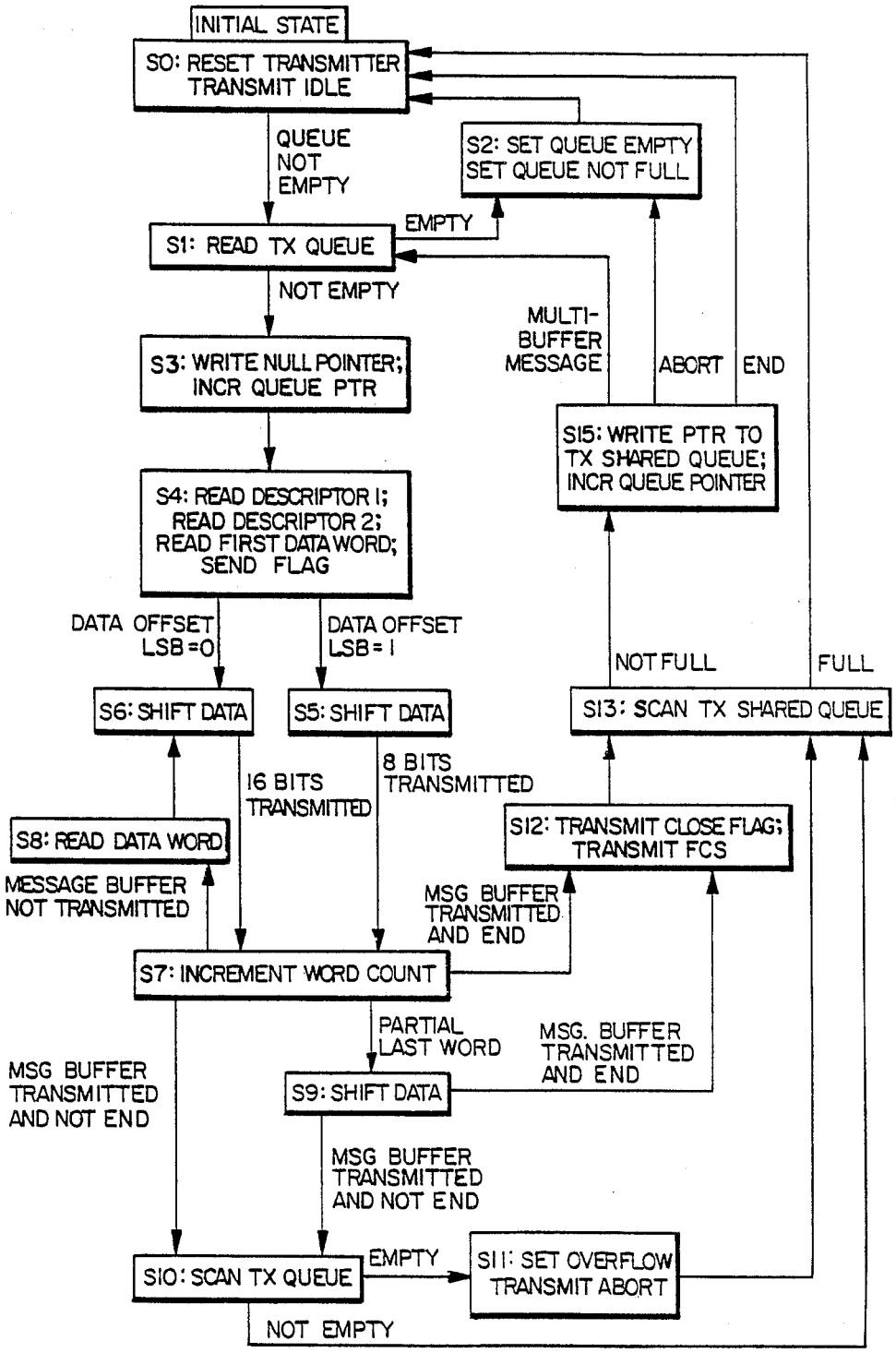

The transmitter state diagram, in FIG. 30, shows how the message frame processor transmit controller interacts with the frame transmitter (FIG. 23), the transmit address generator (FIG. 24), and the transmitter queue status descriptors (FIG. 25).

State 0: The initial state resets the frame transmitter (FIG. 23) which causes the selected idle bit pattern to be transmitted on the lead 241. The bit stream output in this state is either continuous 1s, or continuous flags, which is a CPU selected option. The message frame processor transmit controller checks the queue status descriptor (FIG. 25) for the currently active channel on every transmitted bit, to detect whether there is data to be transmitted.

State 1: When the transmit queue status descriptor indicates that the queue is not empty, the frame transmitter reads the next pointer out of the transmit queue for the active channel.

State 2: If the transmit queue is empty, then the queue status descriptor is updated to reflect this condition. The queue is set to EMPTY, and NOT full.

State 3: The queue location is overwritten with a NULL to indicate that the pointer has been removed and the transmit queue pointer (163 to **163*b***) is incremented.

State 4: The two descriptor words for the message frame buffer are loaded into the message frame processor. The most significant twelve bits of descriptor 2, which correspond to a word count, are loaded into the address generator maximum count register 165. The first data word to be transmitted is then loaded into 243 via 244 using the message buffer address in the address generator 161 to **162*b***. An opening flag is transmitted to begin the serial transmission of the message. There is an explicit open and close flag transmitted for every message, rather than allowing adjacent messages to share opening and closing flags.

State 5: If the data byte offset in descriptor 1 is an odd number, then the first word of the message buffer contains only eight bits.

State 6: The parallel data word (243) is converted to sixteen serially transmitted bits.

State 7: The word count (**162*b***) is incremented after every data word has been transmitted until the message buffer has been completely transmitted.

State 8: If the message frame buffer has not been completely transmitted, then the next data word is read from the message frame buffer.

State 9: The message frame buffer data structure allows any number of bits to be specified for transmission. A condition called a partial last word can occur depending on the number of residual bits, the byte count (even or odd), and the data byte offset (even or odd). The message frame processor detects this condition with reference to the residual bit count in descriptor 2 and thus transmits only the valid data bits from the message frame buffer.

State 10: If the message frame buffer did not contain the entire message due to data chaining, then the message frame processor will not send the FCS and the close flag when all the data bits in the message frame buffer have been transmitted. If the transmit queue contains another pointer, then the next part of the message will be transmitted after the pointer to the current message frame buffer has been placed in the transmit shared queue (TXS).

State 11: If the transmit queue is empty, an error condition will be signalled to the CPU 52 by setting the overflow bit 9 in FIG. 7 in the current message frame buffer before the pointer is returned to the CPU via the transmit shared queue. The transmitter will then transmit an abort sequence on the serial channel via the lead 241 (FIG. 23) to indicate that an underrun has occurred State 12: If the message was completely contained in the current message frame buffer, then the end bit will indicate this condition. In this case, the transmitted message buffer will be followed by transmitting the sixteen bit computed FCS followed by a closing flag.

State 13: The transmit shared queue is scanned. If the queue is full, an error condition has occurred and the frame processor returns to state 0.

State 14: If the transmit shared queue is not full, then the pointer to the transmitted message frame buffer is written to the TXS queue and the transmit shared queue pointer 164 in FIG. 24 is incremented. If the message transmission terminates normally, then processing returns to state 0. If the transmission of a chained message was aborted because the look ahead scan in state 10 indicated that the transmit queue did not contain the remainder of the message, then the queue status must be updated via state 2. If the scan in state 10 indicated that there were more message buffers to be transmitted, then processing of the chained message transmission continues with state 1.

What is claimed is:

1. A method for exchange terminating D channelized information originating at [ISDN]integrated services digital network (ISDN) subscriber terminals, comprising the steps of:

(a) receiving bit states of prearranged bit position occurrence in a bit stream of ISDN subscriber digital line associated time division multiplexed channels;

(b) in relation to each of said channels detecting start flags and stop flags as indicated by an occurrence of a predetermined exclusive series of said bit state occurrence;

(c) selecting a start address defining the first of a series of storage locations for storing bit states of a channel which occurred between the start and stop flags;

(d) storing said bit states at said series of storage locations defined by incrementing the start address by a factor related to the number of bits between the start and stop flags; and (e) storing the start address in a predefined input address queue for subsequent use in accessing said series of storage locations.

2. A method for D channelizing informations destined for [ISDN]integrated services digital network (ISDN) subscribers' digital lines, comprising the steps of:

obtaining start addresses from a predefined output address queue, each start address defining the first of a series of storage locations wherein bit states destined for transmission to the ISDN subscriber digital lines are stored;

reading the storage locations one after another and distributing the read bit states in sequence into prearranged bit position occurrences in a bit stream being received by the ISDN subscribers' digital lines.

3. A method for handling information relating to one of telephone call progress and data at an exchange termination in an [ISDN]integrated services digital network (ISDN). comprising the steps of:

(a) receiving bit states of prearranged bit position a bit stream of ISDN subscriber digital line associated time division multiplexed channels;

(b) in relation to each of said channels detecting start flags and stop flags as indicated by an occurrence of a predetermined exclusive series of said bit state occurrences;

(c) selecting a start address defining the first of a series of storage locations for storing bit states of a channel which occurred between the start and stop flags;

(d) storing said bit states at said series of storage locations defined by incrementing the start address by a factor related to the number of bits between the start and stop flags; and (e) storing the start address in a predefined input address queue for subsequent use in processing;

(f) [determine]determining in relation to each address in the input queue whether the associated stored information is at least one of (i) a telephone call progress, and (ii) a packet of data;

(g) in response to a determination of (i), reading the series of address locations and translating the read information from an ISDN protocol to a protocol of a controller in the exchange termination;

(h) in response to a determination of (ii) transferring the address to a predefined output queue associated with a time division group of channels terminated at a packet switching node;

(i) obtaining a start address from a predefined output address queue, said start address defining the first of a series of storage locations wherein bit states destined for transmission to an ISDN subscriber digital line are stored; and (j) reading the storage locations one after another and distributing the read bit states in sequence into prearranged bit position occurrence in a bit stream of ISDN subscriber digital line associated time division multiplex channels.

4. A method for transporting an [ISDN]integrated services digital network (ISDN) subscriber destined data packet from a packet switching node to a D channel of the ISDN subscriber, comprising the steps of:

(a) sequentially transmitting bit states of the data packet in prearranged bit position occurrence in a channel of a time division multiplex bit stream;

(b) receiving said bit states at an exchange termination and detecting start and stop flags as indicated by occurrence of a predetermined exclusive series of said bit state occurrences;

(c) selecting a start address defining the first of a series of storage locations for storing bit states of the packet;

(d) storing said bit states at said series of storage locations as determined by incrementing the start address by a factor related to the number of bits between the start and stop flags; and (e) storing the start address in a predefined output address queue for subsequent use in accessing said series of storage locations;

(f) subsequently obtaining the start address from the address queue;

(g) reading the storage locations, beginning with the start address in sequence one after the other and distributing the read bit states in sequence into prearranged bit position occurrence in a bit stream of a channel associated with the ISDN subscriber D channel.

5. A method for operating a D channel handler which includes a receiver and a transmitter for depositing data in and withdrawing data from message buffer frames in a random access memory (RAM), a method comprising the steps of:

(a) predefining a plurality of said message frame buffers, each message frame buffer being of a predetermined data storage capacity and being accessible via a predetermined address pointer;

(b) predefining bit positions for occupancy by said datas in channels of receive and transmit time division multiplex (TDM) bit streams;

(c) scanning said predefined bit positions of each of the channels of the receive TDM bit stream for a predefined sequence of bit states indicating a start flag, and thereafter;

in response to a start flag occurrence scanning said bit positions of the channel for a predefined sequence of bit states indicating a stop flag, and meanwhile;

collecting words of data being signified by the bit states being received between the occurrence of the start flag and an occurrence of the stop flag;

storing each collected word at an address location within one of the message frame buffers in the RAM; and writing an address pointer corresponding to the location of the message frame buffer at a storage location of a receive queue for the channel;

(d) writing an address pointer corresponding to a location a message frame buffer, in the RAM which contains data words destined for transmission via a channel of the transmit TDM bit stream, into a storage location of a transmit queue corresponding to said channel;

sequentially reading the data words beginning with a start address defined by the address pointer in the transmit queue and mapping the bit states of the data words into said predefined bit positions of said channel and thereafter;

deleting said address pointer from the transmit queue.

6. A method as defined in claim 5 wherein a plurality of message frame buffers of predetermined maximum number is available as storage locations for received data occurring between said start and stop flags and in a case wherein all of the plurality of message frame buffers is filled with data prior to an occurrence of the stop flag, a predetermined bit storage position within one of the frame message buffers is set to indicate an overflow occurrence.

7. A method as defined in claim 5 wherein more than one message frame buffer is available as storage locations for data of a message, and wherein a one of the message frame buffers contains an end of the message, a predetermined bit storage location within the message frame buffer is set to indicate that said message frame buffer contains the end of the message.

8. A method as defined in claim 5 wherein a message frame buffer containing a beginning of data of a message also includes a predetermined bit storage position which is set to indicate the start of the message contained in the message frame buffer.

9. A method as defined in claim 5 wherein a predetermined plurality of bit positions in each message frame buffer is set to indicate an actual number of bit positions which are occupied by the data of a message contained in the message frame buffer.

10. A method for receiving, processing, and distributing channelized data messages bounded by start and stop flags comprising the steps of:

providing a plurality of receive queues, each of said receive queues corresponding exclusively to a channel from which said data is receivable, and each of said receive queues being composed of queue elements for storing pointers to message frame buffers containing received data, and each of said queue elements being addressable by one of a sequential series of addresses defining the receive queue;

providing a plurality of transmit queues, each of said transmit queues corresponding exclusively to a channel into which said data is transmittable and each of said transmit queues being composed of queue elements for storing pointers to message frame buffers containing transmittable data, and each of said queue elements being addressable by one of a sequential series of addresses defining the transmit queue;

providing a shared receive queue being composed of queue elements for storing pointers to vacant message frame buffers which may be used to contain received data, and each of said queue elements being addressable by one of a sequential series of addresses defining the shared receive queue;

providing a shared transmit queue being composed of queue elements for storing pointers to message frame buffers which contain transmittable data, and each of said queue elements being addressable by one of a sequential series of addresses defining the shared transmit queue;

in response to an occurrence of a start flag in one of said channels from which said data is receivable, at least one element of the corresponding receive queue having a null value stored therein, and at least one element of the shared receive queue having a message frame buffer stored therein, storing data from said channel in the message frame buffer identified by the message frame buffer pointer and thereafter, transferring the message frame buffer pointer from the shared receive queue into said receive queue element, and leaving a null value in its place in the shared receive queue;

in response to each element of a receive queue wherein a message frame buffer pointer is contained, processing the data contained in the corresponding message frame buffer and thereafter transferring the message frame buffer pointer from the receive queue, into a null valued element of the shared receive queue leaving a null value in its place in the receive queue;

in response to data having been prepared for transmission in one of said channels in which said data is transmitted, and at least one element of the shared transmit queue containing a message frame buffer pointer, writing said prepared data into the message frame buffer identified by said pointer and thereafter transferring the message frame buffer pointer from the transmit shared queue to a null valued element of the transmit queue corresponding to said one channel, and leaving a null value in its place in the transmit shared queue;

in response to at least one of the transmit queues having an element occupied by a message frame buffer pointer, transmitting data contained in the indicated message frame buffer into the channel corresponding to said one transmit quene and thereafter transferring the message frame buffer pointer from the transmit queue, into a null valued element of the shared transmit quenue, and leaving a null value in its place in the transmit queue.

11. In a frame processor for an integrated services digital network (ISDN) D channel handler, a synchronous interface means comprising:

a receive data queue including;

an input port for receiving data from an incoming TDM signal stream, a queue input control means being responsive to an incoming clock time slot signal for specifying storage locations in the receive data queue for temporarily storing the received data, a queue output control means being responsive to an input control time slot signal for specifying storage locations in the receive data queue from whence data is output via an output port, and a receive comparing means being responsive to the specifications of storage locations for indicating one of a close proximity and an overlap of specified storage locations, whereby a rate of data output via the output port may be accelerated by increasing a rapidity of the input control time slot signal to prevent an overrun of the temporarily stored data; and a transmit data queue including;

a queue input control means being responsive to an output control time slot signal for specifying storage locations in the transmit data queue in which data received via an input portion is temporarily stored, an output port for transmitting data in a TDM signal stream, a queue output control means being responsive to an output clock time slot signal, similar to said input clock time slot signal, for specifying storage locations in the transmitted data queue from whence data is output via said output port, and a transmit comparing means being responsive to the specifications of storage locations for indicating one of a close proximity and an overalp of specified storage locations, whereby the rate of the data input via the input port may be accelerated by increasing the rapidity of the output control time slot signal to reduce the likelihood of an absence of data occurrence in the transmit data queue.

* * * * *